(12) United States Patent
Sasaki et al.

(10) Patent No.: US 10,417,195 B2
(45) Date of Patent: Sep. 17, 2019

(54) MANAGEMENT SYSTEM FOR MANAGING INFORMATION SYSTEM

(71) Applicant: HITACHI, LTD., Tokyo (JP)

(72) Inventors: Asami Sasaki, Tokyo (JP); Taiki Eiraku, Tokyo (JP); Yuusuke Asai, Tokyo (JP); Kousuke Shibata, Tokyo (JP)

(73) Assignee: HITACHI, LTD., Tokyo (JP)

( * ) Notice: Subject to any disclaimer, the term of this patent is extended or adjusted under 35 U.S.C. 154(b) by 100 days.

(21) Appl. No.: 15/553,303

(22) PCT Filed: Aug. 17, 2015

(86) PCT No.: PCT/JP2015/073016
§ 371 (c)(1),
(2) Date: Aug. 24, 2017

(87) PCT Pub. No.: WO2017/029700
PCT Pub. Date: Feb. 23, 2017

(65) Prior Publication Data
US 2018/0046620 A1 Feb. 15, 2018

(51) Int. Cl.
*G06F 16/182* (2019.01)
*G06F 16/958* (2019.01)
(Continued)

(52) U.S. Cl.
CPC ........ *G06F 16/1827* (2019.01); *G06F 3/0482* (2013.01); *G06F 9/451* (2018.02);
(Continued)

(58) Field of Classification Search
CPC .................................................. G06F 3/0481
(Continued)

(56) References Cited

U.S. PATENT DOCUMENTS 7,315,985 B1 * 1/2008 Gauvin ................... H04L 41/12
715/734
7,475,363 B1 * 1/2009 Yehuda ................. G06F 3/0481
707/999.1
(Continued)

FOREIGN PATENT DOCUMENTS

JP 05-02382 A 1/1993
JP 05-119943 A 5/1993
(Continued)

OTHER PUBLICATIONS

International Search Report for WO 2017/029700 A1, dated Nov. 10, 2015.

*Primary Examiner* — Cao H Nguyen
(74) *Attorney, Agent, or Firm* — Volpe and Koenig, P.C.

(57) ABSTRACT

A management system displays two or more columns lined up in accordance with a sequence order of a selected display rule. Each display rule is a customized rule, and includes a first type, one or more second types, and a sequence order of display for two or more columns respectively corresponding to the first type and the one or more second types. In a first column, which corresponds to a selection type, one or more objects is displayed respectively corresponding to a one or more elements, and in each of a one or more second columns, an object is displayed which belongs to a type corresponding to the second column, and corresponds to an element that is topologically related to at least one of the one or more selected elements.

15 Claims, 28 Drawing Sheets

(51) Int. Cl.
    *G06F 13/00*     (2006.01)
    *G06F 9/451*     (2018.01)
    *G06F 11/34*     (2006.01)
    *G06F 3/0482*     (2013.01)
    *G06F 11/07*     (2006.01)
    *G06F 11/32*     (2006.01)

(52) U.S. Cl.
    CPC ........ *G06F 11/0712* (2013.01); *G06F 11/321* (2013.01); *G06F 11/324* (2013.01); *G06F 11/3452* (2013.01); *G06F 13/00* (2013.01); *G06F 16/972* (2019.01)

(58) Field of Classification Search
    USPC .......................................... 715/725, 851, 840
    See application file for complete search history.

(56) References Cited

U.S. PATENT DOCUMENTS

| | | |
|---|---|---|
| 2006/0005066 A1 | 1/2006 | Brauneis, Jr. et al. |
| 2006/0095428 A1 | 5/2006 | Sugimori et al. |
| 2009/0249213 A1* | 10/2009 | Murase .................. H04L 41/12 715/735 |
| 2010/0180230 A1* | 7/2010 | Bogner ................ G06F 3/0481 715/810 |
| 2016/0119192 A1 | 4/2016 | Tanoue et al. |

FOREIGN PATENT DOCUMENTS

| | | |
|---|---|---|
| JP | 2006-127274 A | 5/2006 |
| JP | 2009-211596 A | 9/2009 |
| JP | 2011-517346 A | 6/2011 |
| JP | 5744362 B1 | 5/2015 |
| WO | 2009/122626 A1 | 10/2009 |

\* cited by examiner

FIG. 13A

| # | Operation name | Operation content |
|---|---|---|
| 1 | Column development operation | Double-click on element desired to be analyze target. |
| 2 | Detail display operation | Right-click on element desired to be analyze target. Select [Context menu]-[Refer to function information]. |
| 3 | Column adding operation | Right-click on element desired to be analyze target. Select [Context menu]-[Add to failure investigation screen]. |
| 4 | Influence range display operation | Right-click on element. Select [Context menu]-[Confirm influence range]. |
| 5 | Template saving operation | Right-click on screen. Select [Context menu]-[Save template]. |
| 6 | Template grouping operation | Right-click on screen. Select [Context menu]-[Group templates]. |

FIG. 13B

| # | Context menu | | | Description |
|---|---|---|---|---|
| 1 | Detail reference | Target information | | Refer to detail of selected element. |
| | | Metric type | IOPS | |
| | | | Latency | |
| | | | ... | |
| | | Log information | | |
| 2 | Add column on failure investigation screen | | | Add column including selected element object on failure investigation screen. |
| 3 | Confirm influence range | Element type | | Display element relating to selected element by specifying column. |
| | | −Tags | | |
| | | −VM | | |
| | | ... | | |
| 4 | Save template | | | Save developmental process of screen used in failure investigation as template. |
| 5 | Group templates | | | Save developmental process of screen used in failure investigation as template and register template in group. |

FIG. 14

| Element ID | Element Name | Element Type |
|---|---|---|
| 1 | VM#01 | VM |
| 2 | VSP#01 | Storage |
| 3 | VM#02 | VM |
| 4 | Tokyo Company | Tag |
| 5 | 10.10.33.0 | LAN |
| 6 | Fablic-1 | SAN |
| 7 | DS1 | Data Store |
| ... | ... | ... |

| Element ID | Related Element ID |
|---|---|
| 4 | 1 |
| 4 | 2 |
| 5 | 8 |
| 6 | 7 |

| Group ID | Group Name |
|---|---|
| 1 | Storage |
| 2 | FC Switch |
| 3 | Company21 Resources |
| ... | ... |

| Element ID | Event Type | Event Type Name | Occurrence Time | Event Message ID |
|---|---|---|---|---|
| 1 | 1 | CPU | 2014/02/11 09:00:11 | 100 |
| 3 | 2 | Memory | 2014/02/21 04:52:21 | 201 |
| 5 | 3 | transfer rate | 2014/03/14 22:33:54 | 301 |
| 7 | 4 | Disk I/O | 2014/03/26 15:03:41 | 454 |
| 9 | 1 | CPU | 2014/03/27 17:08:33 | 100 |
| 1 | 2 | Memory | 2014/03/28 18:00:02 | 201 |
| ... | ... | ... | ... | ... |

| Rule ID | Group ID | Event Type | Column Num | Ref Column Num | Element Type | Metric Type | Threshold Value | others |
|---|---|---|---|---|---|---|---|---|
| 1 | 2 | 1 | 1 | - | VM | latency | 100 | ... |
| 1 | - | - | 2 | 1 | HV | IOPS | 500 | ... |
| 1 | - | - | 3 | 2 | DS | - | - | ... |
| 1 | - | - | 4 | 3 | FC Switch | - | - | ... |
| 1 | - | - | 5 | 4 | LDEV | - | - | ... |
| ... | ... | ... | ... | ... | ... | ... | ... | ... |

| Rule ID | Group ID | Event Type | Column Num | Ref Column Num | Element Type | Metric Type | Threshold Value | others |
|---|---|---|---|---|---|---|---|---|
| 2 | 1 | 3 | 1 | - | VM | latency | 100 | ... |
| 2 | - | - | 2 | 1 | HV | IOPS | 500 | ... |
| 2 | - | - | 3 | 2 | SSD | - | - | ... |
| 2 | - | - | 4 | 3 | FC Switch | - | - | ... |
| 2 | - | - | 5 | 4 | LDEV | - | - | ... |
| ... | ... | ... | ... | ... | ... | ... | ... | ... |

AND operation result 1900P

| Rule ID | Group ID | Event Type | Column Num | Ref Column Num | Element Type | Metric Type | Threshold Value | others |
|---|---|---|---|---|---|---|---|---|
| 3 | 2 | 1 | 1 | - | VM | latency | 100 | ... |
| 3 | - | - | 2 | 1 | HV | IOPS | 500 | ... |
| 3 | - | - | 3 | 2 | FC Switch | - | - | ... |
| 3 | - | - | 4 | 3 | LDEV | - | - | ... |
| ... | ... | ... | ... | ... | ... | ... | ... | ... |

OR operation result  1900Q

| Rule ID | Group ID | Event Type | Column Num | Ref Column Num | Element Type | Metric Type | Threshold Value | others |
|---|---|---|---|---|---|---|---|---|
| 3 | 2 | 1 | 1 | - | VM | latency | 100 | ... |
| 3 | - | - | 2 | 1 | HV | IOPS | 500 | ... |
| 3 | - | - | 3 | 2 | DS | - | - | ... |
| 3 | - | - | 4 | 3 | SSD | - | - | ... |
| 3 | - | - | 5 | 4 | FC Switch | - | - | ... |
| 3 | - | - | 6 | 5 | LDEV | - | - | ... |
| ... | ... | ... | ... | ... | ... | ... | ... | ... |

FIG. 20A

Replace operation result     1900R

| Rule ID | Group ID | Event Type | Column Num | Ref Column Num | Element Type | Metric Type | Threshold Value | others |
|---|---|---|---|---|---|---|---|---|
| 1 | 2 | 1 | 1 | - | VM | latency | 100 | ... |
| 1 | - | - | 2 | 1 | HV | IOPS | 500 | ... |
| 1 | - | - | 3 | 2 | SSD | - | - | ... |
| 1 | - | - | 4 | 3 | FC Switch | - | - | ... |
| 1 | - | - | 5 | 4 | LDEV | - | - | ... |
| ... | ... | ... | ... | ... | ... | ... | ... | ... |

FIG. 20B

Delete operation result     1900S

| Rule ID | Group ID | Event Type | Column Num | Ref Column Num | Element Type | Metric Type | Threshold Value | others |
|---|---|---|---|---|---|---|---|---|
| 1 | 2 | 1 | 1 | - | VM | latency | 100 | ... |
| 1 | - | - | 2 | 1 | HV | IOPS | 500 | ... |
| 1 | - | - | 3 | 2 | FC Switch | - | - | ... |
| 1 | - | - | 4 | 3 | LDEV | - | - | ... |
| ... | ... | ... | ... | ... | ... | ... | ... | ... |

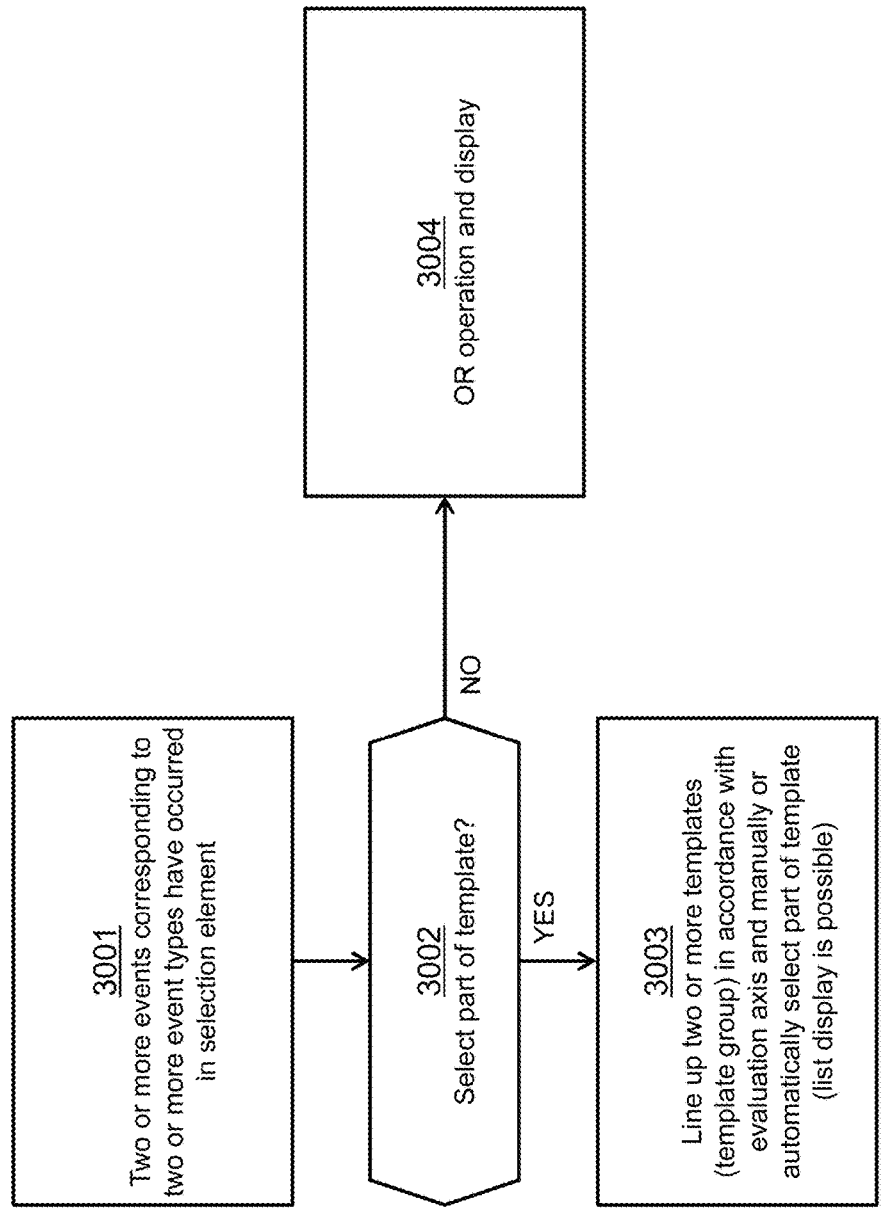

MANAGEMENT SYSTEM FOR MANAGING INFORMATION SYSTEM

TECHNICAL FIELD

This invention generally relates to management of an information system including a plurality of types of a plurality of elements.

BACKGROUND ART

In general, in the management of an information system, information on a plurality of elements included in the information system is displayed, and a manager manages the information system on the basis of the displayed information. For example, PTL 1 is known as this type of technology. According to PTL 1, the elements of the information system are displayed in multicolumn and end-to-end relationships between the elements are drawn by lines.

CITATION LIST

Patent Literature

[PTL 1]
WO2009/122626

SUMMARY OF INVENTION

Technical Problem

The information system has been upsized and are starting to include various types of components due to the trend of a cloud system and the like. However, when the elements of the information system as above are displayed in multicolumn by the technology of PTL 1, the number of columns are increased, thereby deteriorating the visibility.

Solution to Problem

A management system selects a display rule in which a selection type that is a type to which one or more elements selected on the basis of a monitoring result belong is used as a first type, the display rule being associated with an event type of an event that has occurred in at least one of the one or more elements. The management system displays two or more columns lined up in a sequence order in accordance with the selected display rule. Each display rule is a customized rule. The display rule includes a first type, one or more second types, and a sequence order of display for two or more columns respectively corresponding to the first type and one or more second types. One or more objects respectively corresponding to the one or more selected elements are displayed in a first column (head column) that is a column corresponding to the selection type. In each of one or more second columns (one or more columns other than the first column), an object corresponding to an element belonging to a type corresponding to the second column and topologically related to at least one of the one or more selected elements is displayed.

Advantageous Effects of Invention

The visibility does not deteriorate even if the number of elements increases.

BRIEF DESCRIPTION OF DRAWINGS

FIG. 13A illustrates an example of a relationship between user operation and an operation content.

FIG. 13B illustrates an example of a relationship between the user operation and the context menu.

FIG. 14 illustrates an example of an element list table.

FIG. 15 illustrates an example of an element relationship table.

FIG. 16 illustrates an example of a group table.

FIG. 17 illustrates an example of an element event table.

FIG. 18A illustrates an example of a first template table.

FIG. 18B illustrates an example of a second template table.

FIG. 20A illustrates an example of a template table as a replace operation result of the template tables in FIG. 18A and FIG. 18B.

FIG. 20B illustrates an example of a template table as a delete operation result of the template table in FIG. 18A.

FIG. 30 illustrates an overview of an example of processing executed when two or more events corresponding to two or more event types occur for at least one selection element.

DESCRIPTION OF EMBODIMENTS

Figure 1:
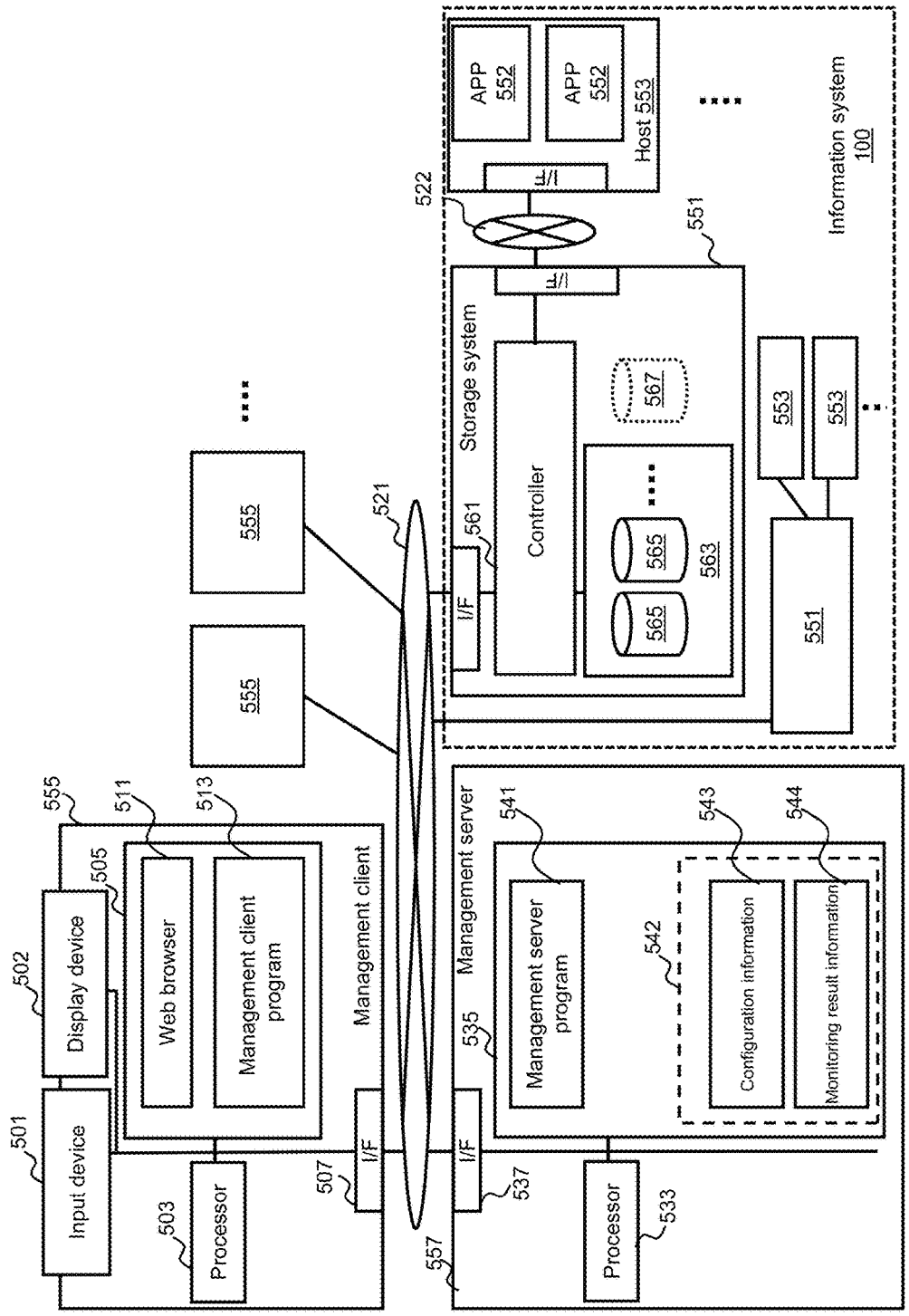
FIG. 1 illustrates a configuration of an information system and a management system according to an embodiment.

An embodiment is described in the description below.

In the description below, information may be described with use of the expression of "abc table", but the information may be expressed with a data configuration other than a table. At least one "abc table" can be referred to as "abc information" in order to show that the information does not depend on the data configuration. In the description below, the configuration of each table is an example. Hence, one table may be divided into two or more tables and all or a part of two or more tables may be one table.

In the description below, a "storage unit" may be one or more storage devices including a memory. For example, the storage unit may be at least a main storage device (typically, a volatile memory) out of the main storage device and an auxiliary storage device (typically, a non-volatile storage device).

In the description below, processing may be described to be executed by a "program", but may be described to be executed by a processor because the program is executed by the processor (for example, a CPU (Central Processing Unit)) to execute a predetermined processing with use of a storage unit (for example, a memory), an interface device (for example, a communication port), and/or the like as appropriate. The processing described to be executed by the program may be processing executed by the processor or an apparatus or a system including that processor. The processor may include a hardware circuit configured to execute a part or all of the processing. The program may be installed in an apparatus such as a computer from a program source. The program source may be a program distribution server or a storage media readable by the computer, for example. When the program source is the program distribution server, the program distribution server includes the processor (for example, the CPU) and the storage unit and the storage unit may further store a distribution program and a distribution target program therein. The processor of the program distribution server may execute the distribution program, to thereby distribute the distribution target program to other computers. In the description below, two or more programs may be implemented as one program and one program may be implemented as two or more programs.

In the description below, names or IDs are used as identification information for the elements and display rules, but the names or the IDs can replace each other and other types of identification information may be used instead of or in addition to at least one of the names or the IDs. In the description below, an "element" means a component of the information system, that is, generic names of a plurality of nodes (apparatuses) forming the information system and a plurality of components included in each node. The node includes a physical node (for example, a network switch) and a logical node (for example, a virtual machine). The component includes a physical component (for example, a microprocessor) and a logical component (for example, an LDEV (logical volume)).

A management system may include one or more computers. Specifically, for example, when the management computer displays information (specifically, when the management computer displays information on its own display device or when the management computer sends information to be displayed to a remote computer for display), the management computer is the management system. For example, when a function similar to that of the management computer is executed by a plurality of computers, the plurality of computers (may include the computer for display when the computer for display executes the display) are the management system. In this embodiment, a management server 557 is the management computer and a management client 555 is the computer for display.

In the description below, operation a user (for example, a manager) executes on a GUI (Graphical User Interface) screen as a management screen of the information system with use of an input device is referred to as "user operation". In general, the input device used for the user operation is a pointing device or a touch screen.

First, an overview of this embodiment is described.

In recent years, for example, the information system has become upsized and more complicated due to at least one of the following causes.

(*) Processing handled by the information system is upsized.

(*) Large amount of processing such as a cloud service is executed by the information system.

(*) The types of nodes in the information system has increased.

(*) The inner structure of the node has become more complicated, the types of the components included in the node (for example, the logical component and the physical component) have increased, and the inner structure and the components need to be managed.

(*) The virtualization technology (for example, server virtualization, network virtualization, storage virtualization, and data center virtualization) has widely spread, and division and integration of the apparatuses have become possible.

(*) The deployment and migration technology has progressed.

"To be upsized" means that the number of elements serving as management targets in the information system such as the nodes included in the information system and the components of the nodes are increased. "To become more complicated" means that at least one relationship between the elements has become a relationship of M:1, 1:N, and M:N (M and N are integers equal to or larger than 2) due to the increase in the types of the management target elements, at least one value of M and N has increased, and the relationship between the elements changes from moment to moment.

In a general topology display technology, the display objects of the elements that are the display targets are all displayed and lines are displayed between the display objects in order to show the relationship between the elements. However, when the general topology display technology is applied to the information system that has upsized and has become more complicated, the user cannot efficiently grasp the element in a problem state quickly and grasp the states of the relating elements for analyzing. The cause thereof corresponds to at least one of the following.

(A) The number of the display objects that are displayed increases too much when upsize is performed, resulting in the decrease of efficiency. For example, when the display objects of all the element are displayed on one screen, the size of each of the display objects of the elements is reduced. When the size of each of the display objects is retained, the display objects of all the elements do not fit on one screen, and the user needs to grasp the relationship between the elements by the scrolling the screen, which is burdensome.

(B) When the number of element types increases, there is a limit to how to distinguish the element types by at least one of the shape and the color of the display object. As a matter of practice, when the size of the display object is too large, the number of display objects that can be displayed on one screen decreases. However, when a large number of element types are expressed with icons having a small size, the user cannot distinguish the shapes of the icons from one another without closely observing those icons, which degrades efficiency.

(C) Many relationship lines are rendered between the display objects due to the complicating and the upsizing. As a result, the relationship between the elements cannot be grasped.

(D) A case is assumed in which the management system can arrange the display objects on the screen regarding the relationship of the elements, to thereby avoid the overlapping of the relationship lines as much as possible in order to make the topology display easier to see. However, when the relationship between the elements varies in time series, the places of the display objects on the screen changes before and after the change of the relationship between the elements due to this function (the function of adjusting the positions of the display objects). As a result, the user cannot efficiently find the desired display object on the screen.

Therefore, in this embodiment, a new display method is implemented.

Specifically, for example, the management system selects a display rule as follows from a plurality of display rules. That is, the display rule uses a selection type that is a type to which one or more elements selected on the basis of a monitoring result belong as a first type and is associated with an event type of an event that has occurred in at least one of the one or more selected elements. "One or more elements selected on the basis of a monitoring result" may be, for example, one or more elements (for example, an element of which metric value is exceeding a threshold value) automatically selected on the basis of a monitoring result (for example, a metric value of each of a plurality of elements) or may be one or more elements selected by the user on the basis of a monitoring result (for example, the entire screen exemplified in FIG. 3). An example of a display rule is a "template" in this embodiment.

The management system displays two or more columns lined up in a sequence order in accordance with the select display rule. In this embodiment, the sequence order is a sequence order from the left to the right (an example of a sequence order in the vertical direction), but the sequence order is not limited thereto and may be a sequence order having some sort of regularity (for example, from the right to the left, from the top to the bottom, and from the bottom to the top).

Each display rule is a customized rule, specifically, for example, as described in detail later, a rule determined in accordance with the user operation in the past related to the column display. The display rule includes a first type, one or more second types, and a sequence order of display of two or more columns respectively corresponding to the first type and one or more second types.

One or more objects corresponding to the one or more selected elements are displayed in the first column (that is the head column, and a column corresponding to the selection type) among the displayed two or more columns. In each of one or more second columns (one or more columns other than the first column) among the displayed two or more columns, an object corresponding to an element, which belongs to a type corresponding to the second column and is topologically related to at least one of the one or more selected elements, is displayed.

As described above, the columns are displayed in accordance with the customized display rule. Thus, the columns are typically displayed after unnecessary columns (and unnecessary elements) are eliminated from all the columns corresponding to all the element types. In other words, the columns are displayed after being narrowed down to necessary columns (and necessary elements). As a result, the visibility can be enhanced.

The selected display rule is a display rule associated with an event type of an event that has occurred in at least one of the one or more selected elements. As a result, the columns that are the display targets can be narrowed down to the columns corresponding to occur the element type suitable for the event type of the event. This contributes to both of the enhancement in the visibility and the enhancement in the analysis accuracy for the event.

This embodiment is described below in detail.

FIG. 1 illustrates a configuration of an information system and a management system according to the embodiment.

An information system 100 may be referred to as a computer system and includes one or more hosts 553 and one or more storage systems 551 coupled to one or more hosts 553. The storage system 551 is coupled to a host 553 via a communication network 521 (for example, a SAN (Storage Area Network) or a LAN (Local Area Network)), for example.

The storage system 551 includes a physical storage device group 563 and a controller 561 coupled to the physical storage device group 563.

The physical storage device group 563 includes one or more PGs (Parity Groups). The PG may be referred to as a RAID (Redundant Array of Independent (or Inexpensive) Disks) group. The PG includes a plurality of physical storage devices and is configured to store data in accordance with a predetermined RAID level. The physical storage device is an HDD (Hard Disk Drive) or an SSD (Solid State Drive), for example.

The storage system 551 includes a plurality of logical volumes. The logical volume includes a substantive logical volume (the real volume) 565 based on the PG and a virtual logical volume (virtual volume) 567 relating to thin provisioning or storage virtualization technology. One storage system 551 does not necessarily need to include a plurality of types of logical volumes. For example, the storage system 551 may only include the real volume 565 as the logical volume. A storage area is allocated to the virtual volume relating to the thin provisioning from a pool. The pool is a storage area group based on one or more physical storage devices (for example, the PGs) and is a set of one or more logical volumes, for example. The pool may be a pool in which a difference between an original logical volume and a snapshot thereof is stored instead of a pool including the storage area allocated to the virtual volume relating to the thin provisioning.

The controller 561 includes a plurality of devices, for example, a port, an MPB (a blade (circuit board) including one or a plurality of microprocessors (MPs)), and a cache memory. For example, the port receives an I/O (Input/Output) command (a write command or a read command) from the host 553 and the MP including the MPB controls I/O of data following the I/O command. Specifically, for example, the MP determines the logical volume that is the destination of the I/O from the received I/O command and executes the I/O of the data for the determined logical volume. The data to be I/O to/from the logical volume is temporarily stored in the cache memory.

The host 553 may be a physical computer or a virtual computer. One or more application programs (APPs) 552 are executed in the host 553. When the APP 552 is executed, an I/O command specifying the logical volume is sent from the host 553 to the storage system 551.

As described above, the information system 100 includes a plurality of tiered elements. The plurality of elements includes, specifically, two or more types of elements out of an APP 552, the host 553, the storage system 551, the controller 561, the port, the MPB, the cache memory, the logical volume, the PG, and the like. By grouping a plurality of elements in the same tier, an element above the elements in the same tier may be defined. The "element" may include a substantive element such as the APP or the logical volume and a virtual element that is a group of the plurality of substantive elements. A "parent element" of an element is the associated with the element and is an element in a higher than the element by one tier. A "child element" of an element is associated with the element and is an element lower than the element by one tier. The child element may be referred to as a "subelement".

The management system includes the management server 557 and one or more management clients 555 coupled to the management server 557. The management client 555 is coupled to the management server 557 via the communication network (for example, a LAN, a WAN (World Area Network), or the Internet) 521.

The management client 555 includes an input device 501, a display device 502, a storage unit 505, a communication interface device (hereinafter referred to as an I/F) 507, and a processor (for example, a CPU (Central Processing Unit)) 503 coupled thereto. The input device 501 is a pointing device and a keyboard, for example. The display device 502 is a device including a physical screen on which information is displayed, for example. A touch screen in which the input device 501 and the display device 502 are integrated may be employed. The I/F 507 is coupled to the communication network 521 and the management client 555 may communicate to/from the management server 557 via the I/F 507. The communication network 521 and the network coupling the host 553 and the storage system 551 to each other may be partly or entirely in common.

The storage unit 505 may store a computer program executed by the processor 503 and information used by the processor 503. Specifically, for example, the storage unit 505 stores therein a Web browser 511 and a management client program 513. The management client program 513 may be a RIA (Rich Internet Application). Specifically, for example, the management client program may be a program file, and may be downloaded from the management server 557 (or other computers) and stored in the storage unit 505.

The management server 557 includes a storage unit 535, an I/F 537, and a processor (for example, a CPU (Central Processing Unit)) 533 coupled thereto. The I/F 537 is coupled to the communication network 521 and the management server 557 may communicate to/from the management client 555 via the I/F 537. The management server 557 may receive an instruction following the user operation or may render a display object in a layout area via the I/F 537. Therefore, the I/F 537 is an example of an I/O interface device. The "layout area" herein is an area in which the display object may be rendered (may be referred to as "lined up"). All or a part of the range of the layout area is a display range in a frame (for example, a window) displayed by the Web browser 511 (or the management client program 513). A display image (including the display object) in the frame of the layout area in which the display object is rendered can be referred to as a display screen or a GUI screen. Out of the objects rendered in the layout area, objects overlapping with the display range is displayed on the physical screen of the display device 502. Therefore, the rendering of the object in the layout area substantially is an example of display of the object.

The storage unit 535 may store therein a computer program executed by the processor 533 and information used by the processor 533. Specifically, for example, the storage unit 535 stores therein a management server program 541 and management information 542. The management information 542 includes configuration information 543 defining tiered relationships (configuration information) between the plurality of elements included in the information system or monitoring result information 544 showing monitoring results of the elements. The information may be information collected and stored by the management server program 541 or may be information acquired and stored through accessing other management systems holding information. The management information 542 may include information defining the management client 555 managed by the management server 557 and a tiered relationship of the components thereof or information holding the monitoring result. The management server program 541 receives the instruction following the user operation from the management client 555 and sends the information to be rendered in the layout area to the management client 555.

GUI screen display corresponding to the user operation is implemented by cooperative processing by the management server program 541, the Web browser 511 (or a RIA execution environment of a client), and the management client program 513. Examples of the cooperation are described below. In order to simplify the description, a case in which (Cooperative Example 2) is employed in this embodiment is described, but it is needless to say that this embodiment can be also applied to Cooperative Example 1.

COOPERATIVE EXAMPLE 1

The management server program 541 sends at least part of the information included in the information 543 and 544 to the Web browser 511 (or the management client program 513) and the Web browser 511 (or the management client program 513) stores the information in the storage unit 505 as temporary information. The Web browser 511 (or the management client program 513) renders the display object in the layout area (for example, newly renders, magnifies, or reduces the display object) on the basis of the instruction following the user operation and the temporary information.

COOPERATIVE EXAMPLE 2

The management server program 541 receives the instruction following the user operation for the display screen from the Web browser 511 (or the management client program 513). Then, on the basis of the instruction and the information 543 or 544, the management server program 541 generates the information to be displayed of the display object and sends the information to be displayed. The Web browser 511 (or the management client program 513) receives the information to be displayed and renders a GUI object in the layout area in accordance with the information to be displayed. That is, in short, the management server program 541 renders the display object in the layout area. When the user operation is performed on the GUI screen, the Web browser 511 (or the management client program 513) sends the instruction following the user operation to the management server program 541.

In the description below, the control on the display is performed by the management server program 541 in order to avoid redundant description.

Figure 2:
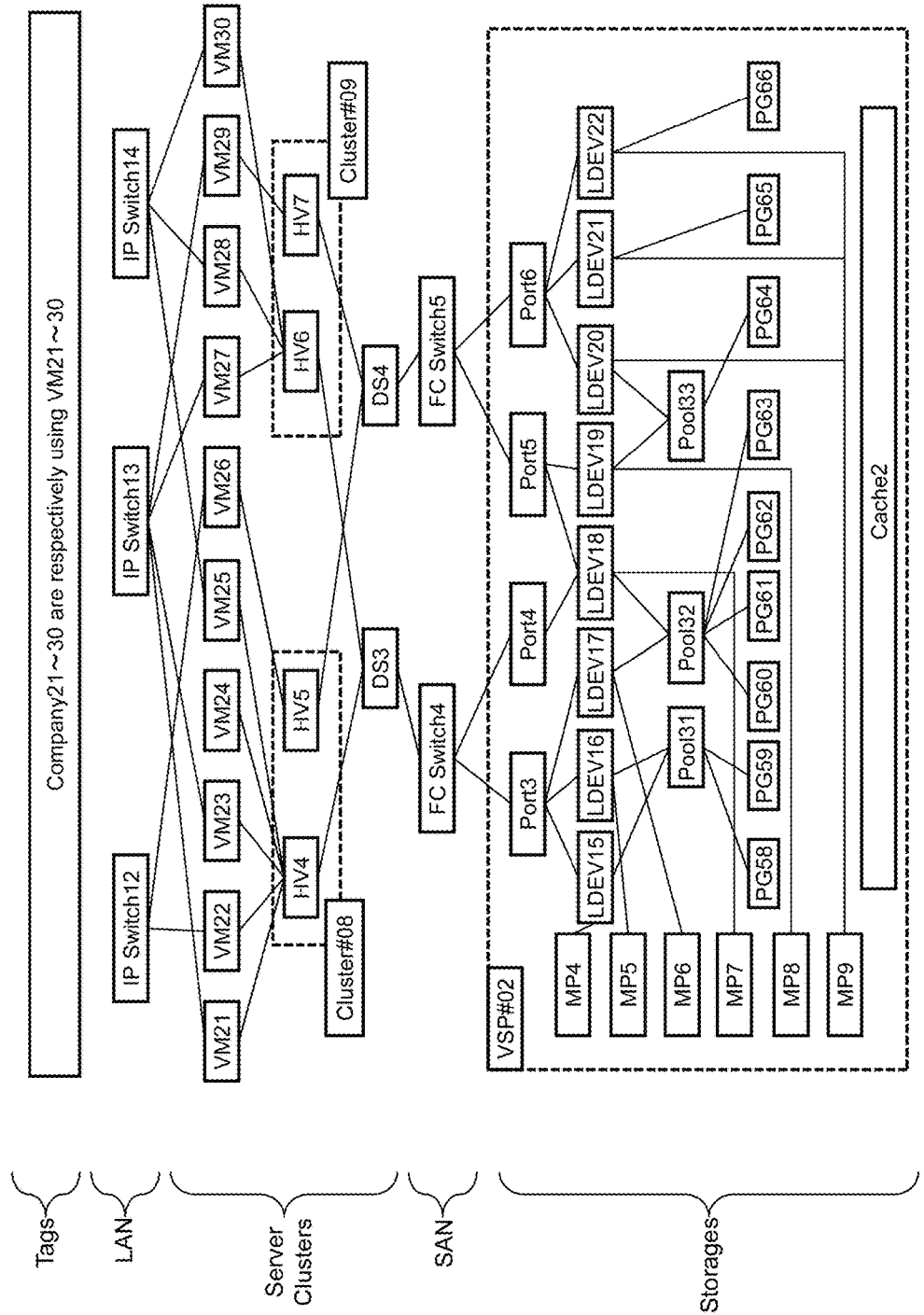
FIG. 2 illustrates an example of an element topology configuration.

FIG. 2 illustrates an example of an element topology configuration.

The information system 100 includes one or a plurality of element topology configurations. For example, in example in the FIG. 2, there are Tags, LAN, Server Clusters, SAN, and Storages as plurality of layers in order from the upper layer. Each layer is one of element types. The elements belonging to the first layer (uppermost layer), that is, "Tags" are "Company" (companies using the elements in the information system 100 (the virtual machines (VMs))). The elements belonging to the second layer, that is, "LAN" are "IP Switch" (IP switches in the LAN). The elements belonging to the third layer, that is, "Server Clusters" include a plurality of types, specifically, "VM" (a virtual machine executed by the host), "HV" (a hypervisor configured to control one or a plurality of the virtual machines and executed by the host), "Cluster" (a cluster of the hypervisors), and "DS" (data store). The "Cluster" is a parent element of the "HV". The "data store" is an element recognized by the hypervisor as the storage device. The elements belonging to the fourth layer, that is, "SAN" are "FC Switch" (FC (Fibre Channel) switches in the SAN). The elements belonging to the fifth layer, that is, "Storages" are "VSP" (storage system). Child elements of the "VSP" include a plurality of types of components included in the storage system, for example, "Port" (a communication port coupled to the FC switch and configured to receive an I/O command from the virtual machine), "LDEV" (logical volume (the real volume or the virtual volume)), "MP" (microprocessor), "Pool" (a storage area including a real area allocated to the virtual volume in accordance with the thin provisioning), "PG" (parity group), and "Cache" (the cache memory in which data to be input and output to/from the logical volume is temporarily stored).

The example in FIG. 2 is as following, for example. Companies "Company21" to "Company30" use virtual machines "VM21" to "VM30" configured to access a storage system "VSP #02". The companies "Company21" to "Company30" (for example, client computers) access virtual machines "VM22" and "VM26" via an IP switch "IP Switch12". The virtual machine "VM22" is controlled by a hypervisor "HV4" that is one of the hypervisors in a cluster "Cluster #08", and the virtual machine "VM26" is controlled by a hypervisor "HV5" that is the other one of the hypervisors in the cluster "Cluster #08". Data is input and output to/from a storage device "DS3" for the hypervisor "HV4" by the virtual machine "VM22", and the data that is input and output to/from the storage device "DS3" is input and output to/from one of logical volumes "LDEV15" to "LDEV18" associated with communication ports "Port3" and "Port4" via an FC switch "FC Switch4". A MP "MP4" is in charge of the logical volume "LDEV15". The logical volume "LDEV15" is a virtual volume, which is associated with a pool "Pool31" and to which a real area is allocated from the pool "Pool31", and the pool "Pool31" is a storage area based on two parity groups "PG58" and "PG59".

The element topology configuration as illustrated in FIG. 2 is a configuration determined by the configuration information shown by the information 543. In this embodiment, the display of a GUI image described later is performed. The display (for example, the display described with reference to FIG. 3 to FIG. 12) is performed for the management client 555 by the management server 557 (the management server program 541) on the basis of the information 543. In the description below, a plurality of examples of the GUI screens displayed to the management client 555 are described. In the description below, the description of the display being performed "by the management server 557 (management server program 541)" may be omitted in order to avoid redundant description. Concepts such as "higher level/lower level" and "parent/child" may change depending on what the user manages (for example, the monitor) and may be omitted. For example, when the relationship is a "coupling relationship" between the server and the storage system via the FC switch, whether the server or the storage system is on the higher level or is the parent is not uniquely determined when seen from the level of simply being coupled. Whether the server is conceived to be on the higher level, the storage system is conceived to be on the higher level, or the concept of high and low is not employed is determined depending on the standpoint of the user. When the relationship is inclusion (for example, the node includes the component), the concept that the component is on a level lower than (or is a child of) the node is used in common for many cases independent of the standpoint of the user.

In this embodiment, when there is a fault element (an element in which it is determined that a fault has occurred), the user (for example, the manager) can perform fault investigation for investigating the cause, the addressing method, or the like of the fault. In this embodiment, the "fault" means an abnormal state and a state of an error or a warning can be collectively referred to as a "fault", for example. The management server program 541 can display an overall configuration screen, which is a screen configured to display the overall configuration of the plurality of elements belonging to a plurality of types and in which the display object of the fault element is emphasized on the basis of the configuration information 543 and the monitoring result information 544. The user can, for example, select a fault element from the overall configuration screen, to thereby proceed with the investigation of the fault of the fault element. The management server program 541 determines whether there is a template (display rule) in which the selection type that is the type the selected element belongs to is a first type. The processing differs depending on the result of the determination.

In the description below, the fault investigation (without a corresponding template) is described with reference to FIG. 3 to FIG. 10 and the fault investigation (with a corresponding template) is described with reference to FIG. 11 to FIG. 12. For the template, when the template saving operation is performed in the fault investigation (without a corresponding template), a template determined in accordance with the user operation in the fault investigation (without a corresponding template) is saved. Thus, the fault investigation (without a corresponding template) is described relatively in detail.

<Fault Investigation (Without a Corresponding Template)>

The "fault investigation (without a corresponding template)" is the first fault investigation or the fault investigation performed when there are no corresponding templates in the saved templates.

Figure 3:
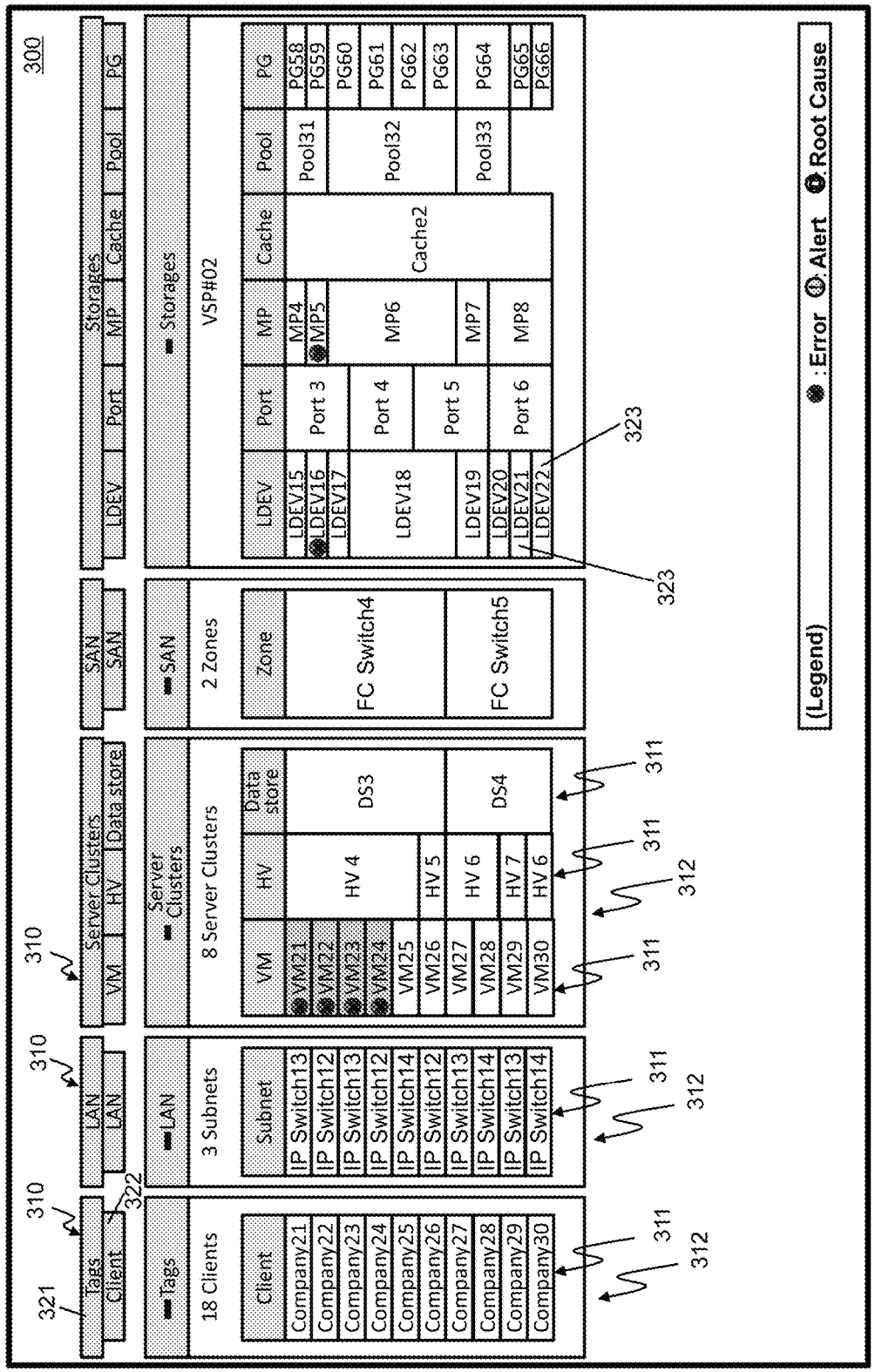
FIG. 3 illustrates an example of an overall configuration screen.

A case in which an overall configuration screen 300 exemplified in FIG. 3 is displayed is conceived. The overall configuration screen 300 is a screen showing the configuration of the elements of the overall information system. The overall configuration screen 300 is generated by the management server program 541 on the basis of the configuration information 543 and the monitoring result information 544.

In the overall configuration screen 300, a plurality of element type objects 310 are displayed to be lined up in the lateral direction, and a plurality of element type group columns 312 respectively corresponding to the plurality of element type objects 310 also are displayed to be lined up in the lateral direction. The element type group column 312 corresponding to the element type object 310 is displayed directly below the element type object 310. The element type corresponding to the object 310 on the left side of the screen is an element type on the higher level. That is, from the left side to the right side, the element types are on the higher level to the lower level. As a result, the tiered relationship between the element types is understood.

The element type object 310 a set including an element type group subobject 321 and one or more element type subobjects 322. The element type group subobject 321 is a display object showing the element type group (a group of one or more element types), and the element type subobject 322 is a display object showing the element type belonging to the element type group. One or more element type subobjects 322 are lined up in the lateral direction. The element type corresponding to the element type subobject on the left side is an element type on the higher level.

The element type group column 312 is a display object corresponding to the element type group. One or more element type columns 311 respectively corresponding to one or more element types belonging to a corresponding element type group are displayed in in the element type group column 312. One or more element type columns 311 also are lined up in the lateral direction, and each element type column 311 is placed below the element type subobject 322 corresponding to the element type corresponding to the column 311. In each element type column 311, one or more display objects (element objects) 323 respectively corresponding to one or more elements belonging the element type corresponding to the column 311 are lined up in the longitudinal direction. The element object 323 is a display object in which a character string showing an element name is displayed, for example. In the example in FIG. 3, the element object 323 is included in the element type column 311, but this is only an example. The association between the element type column 311 and the element object 323 only needs to be expressed so that it can be seen that the element corresponding to the element object 323 belongs to the element type corresponding to the element type column 311. Therefore, the element object 323 may be placed out of the element type column 311.

The element object (for example, the element object "VM21") corresponding to the element that is determined that a predetermined type of event has occurred therein (for example, the fault element) is displayed in an emphasized manner. To "display in an emphasized manner" means to display in a display state that is different from a display state of an element object corresponding to a normal element (an element that is determined that a predetermined type of event has not occurred therein), and may include changing of the color or the pattern of the element object and the font of the display name, or associating of a mark indicating the type of the event that has occurred therewith, for example. In this embodiment, the event is typically an alert and a typical example of the alert is a fault. The fault is an error or a warning. The warning may mean that a metric value of a predetermined metric type for the element is higher than a first threshold value, and the error may mean that a metric value of a predetermined metric type for the element is higher than a second threshold value (the second threshold value>the first threshold value). The management server program 541 may estimate the element that is the root cause of the fault by performing RCA (Root Cause Analysis), to thereby associate the element object corresponding to the element estimated to be the root cause of the fault with a mark indicating that the element is the root cause. The display objects such as the element object 323 and the element type object 310 only need to be objects in which the element names can be displayed, and various forms such as an icon, a square shape, and a circle shape can be used.

In the overall configuration screen 300 exemplified in FIG. 3, it can be seen that the elements "VM21" to "VM24" are error elements (elements that are determined that errors have occurred therein). It is assumed here that the cause of the determination of an error is a latency violation (the latency is higher than the second threshold value).

When the fault investigation is performed, the user selects at least one error element object, to thereby perform column development operation on the overall configuration screen 300. In this case, "VM21" to "VM24" are specified. One or a plurality of element objects can be selected, but the plurality of element objects are selected from the same element type column 311 and a plurality of element objects in different element type columns are not selected at the same time.

Figure 4:
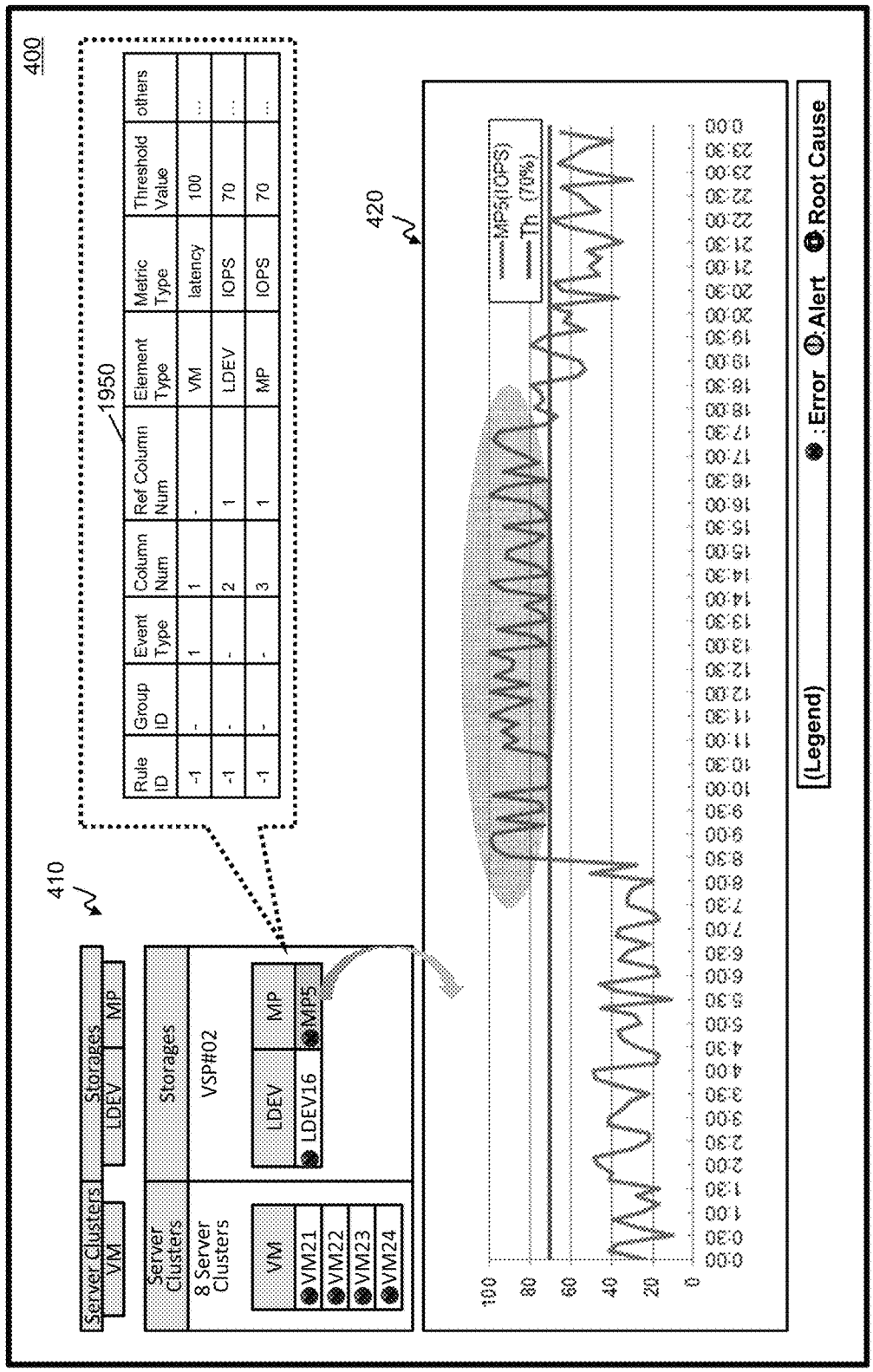
FIG. 4 illustrates an example of a failure investigation screen.

When the management server program 541 receives the selection of "VM21" to "VM24" and the column development operation, the management server program 541 displays a failure investigation screen 400 exemplified in FIG. 4. The failure investigation screen 400 includes a column space 410 and a work space 420. The work space 420 is positioned on the right or left of or above or below the column space 410. In this embodiment, the column space 410 and the work space 420 both have a rectangular shape long in the lateral direction and the work space 420 is placed below the column space 410.

At least one element type object and at least one element type group column are displayed in the column space 410. When a plurality of element type objects and a plurality of element type group columns are displayed, the plurality of element type objects are displayed to be lined up in the lateral direction. Similarly, the plurality of element type group columns are also displayed to be lined up in the lateral direction. In the column space 410, the element type column "VM" including the selected element objects "VM21" to "VM24" is displayed by the management server program 541.

When it is detected on the basis of the configuration information 543 and the monitoring result information 544 by the management server program 541 that there is an element satisfying predetermined conditions, the element type column including the element object corresponding to the element satisfying the predetermined conditions is placed to be lined up on the right side of an element type column "VM". The "predetermined conditions" herein are that (r1) to be topologically related to at least one element of the selected elements "VM21" to "VM24", (r2) an event has occurred that is the same as the event that has occurred in the element (for example, an error), and (r3) to belong to an element type different from the element type "VM". An element Y topologically related to an element X is an element coupled to the element X with or without another element (any element other than the elements X and Y) therebetween. Here, "LDEV16" and "MP5" are detected as the elements satisfying the predetermined conditions. Thus, an element type column "LDEV" including the element object "LDEV16" and an element type column "MP" including the element object "MP5" are displayed to be lined up in the lateral direction on the right side of the element type column "VM". In other words, the element type column "VM" including the selected elements "VM21" to "VM24" is maintained as to be the head column. In this embodiment, the head column is on the leftmost, but predetermined positions such as in the middle may be the head. That is, the "head" may be the head in terms of the physical position or the head in terms of the logical position (for example, the position at which the lowest number is allocated among the order allocated to a plurality of physical column display positions is allocated).

In the column space 410 exemplified in FIG. 4, only the element type columns corresponding to the element type to which the elements satisfying the predetermined conditions belong are displayed as the second element type column and subsequent element type columns. In other words, element type columns corresponding to the element type in which there are no elements satisfying the predetermined conditions are not displayed. As a result, high visibility is obtained. The predetermined conditions do not need to include (r2) (the same event has occurred) of (r1) to (r3).

In the column space 410 exemplified in FIG. 4, in the second element type column and subsequent element type columns, not all the element objects (elements) belonging to the element type corresponding to the column are displayed, and the element objects are displayed after being narrowed down to elements in which events that are the same as the event that has occurred in the element selected by the user (an element corresponding to at least one element object in the head element type column) have occurred (and may be narrowed down through other conditions relating to the relationship between the elements and the element selected by the user). Therefore, the height of the element type column can be reduced, and hence the overall height of the column space 410 can be reduced. As a result, the height of the work space 420 positioned below (or above) the column space 410 can be reserve ensured.

The work space 420 is a space in which details on the element or the element type specified in the column space 410 are displayed. The details on the specified element or the specified type may be information on a relationship between time-series variation of a metric value determined as a result of monitoring the specified element (the metric type includes an IOPS (I/O per second) and a latency, for example) and a threshold value of the metric value, information on a correspondence relationship between the elements belonging to the specified type and the elements belonging to another type, and an attribute of each element belonging to the specified type, for example. The details on the specified element or the specified type are information determined from at least one of the configuration information 543 and the monitoring result information 544 by the management server program 541. The user can perform the fault investigation in the information system 100 while referring to both screens of the overall configuration screen 300 and the failure investigation screen 400 (for example, by switching between the screens as appropriate or by displaying both screens side to side), for example.

For example, a cause of an error in the elements "VM21" to "VM24" can be thought to be an error in the element "LDEV16" or an error in the element "MP5", but the one that is the cause cannot be determined. Thus, the user performs detail display operation (user operation) of specifying "LDEV16" or "MP5" In response to the detail display operation, the management server program 541 displays details on the element "LDEV16" (for example, a relationship between time-series variation of a metric value corresponding to the metric type "IOPS" (or a "response type") and a threshold value) (not shown) or details on the element "MP5" (for example, a relationship between time-series variation of a metric value corresponding to the metric type "IOPS" and a threshold value) in the work space 420. From the details displayed in the work space 420, the user can see that the IOPS of the element "MP5" significantly exceeds the threshold value.

Whenever the display result of the column space 410 changes due to the user operation (for example, whenever at least one of the increase or decrease of the element type columns, the increase or decrease of the element objects, and a change in the sequence order of the element column types occurs), information on the display result after the change is registered in a temporary template table 1950. The temporary template table 1950 is a temporary table stored in the storage unit 535 and may be included in the management information 542. The configuration of the temporary template table 1950 is the same as the configuration of a template table described later. An example of saving a template in this embodiment is to save the information saved in the temporary template table 1950 into the template table in response to template saving operation. The temporary template table 1950 includes an entry (record) for each element type column displayed in the column space 410. The information stored in the entries include a "rule ID (Rule ID)" that is identification information of the template, a "group ID (Group ID)" that is identification information of the template group to which the template belongs, an "event type (Event Type)" that is information on the type of the event, a "column number (Column Num)" that is the number of the element type column corresponding to the entry, a "referred column number (Ref Column Num)" that is the number of the element type column to be referred (previous element type column), an "element type (Element Type)" that is the element type corresponding to the element type column, a "metric type (Metric Type)" that is a metric type corresponding to an element (fault element) in the element type column, and a "threshold value (Threshold Value)" that is a threshold value used when the element is determined as a fault. In FIG. 4, a value indicating a temporary template (for example, "−1") is allocated as the rule ID (the rule ID corresponds to the ID of the template). Columns having smaller column numbers are positioned on the left. In FIG. 4, the identification information (for example, the number) of the event type of the error in the elements "VM21" to "VM24" is registered in the temporary template table 1950 as the "event type". In this embodiment, one "event type" is associated with one template (the temporary template table 1950 and the template table described later) (specifically, there is one event type of the elements belonging to the selection type (the element type corresponding to the head column)), but a plurality of different "event types" (for example, in addition to the event type corresponding to the head column, a type of the event that has occurred in the elements belonging to the element type corresponding to a different column) may be associated with one template. In this embodiment, one "group ID" is associated with one template (that is, one template only belongs to any one of the template groups), but a plurality of different "group IDs" may be associated with one template (that is, one template may belong to a plurality of different template groups). At least one of the "event type" and the "group ID" may be at a place different from the head entry. In FIG. 4, each of the elements "VM21" to "VM24" is determined as an error because the latency of the element has exceeded 100, and hence "latency" is registered as the "metric type" and "100"

is registered as the "threshold value". In FIG. 4, the display result in the column space 410 and the content of the temporary template table 1950 are illustrated in the same drawing in order to make the correspondence relationship between the display result in the column space 410 and the content of the temporary template table 1950 easy to understand, but the temporary template table 1950 may not be actually displayed on the screen 400 as shown by a dotted-line frame. The same applies to FIG. 5, FIG. 7, FIG. 9, and FIG. 10 described later.

Figure 5:
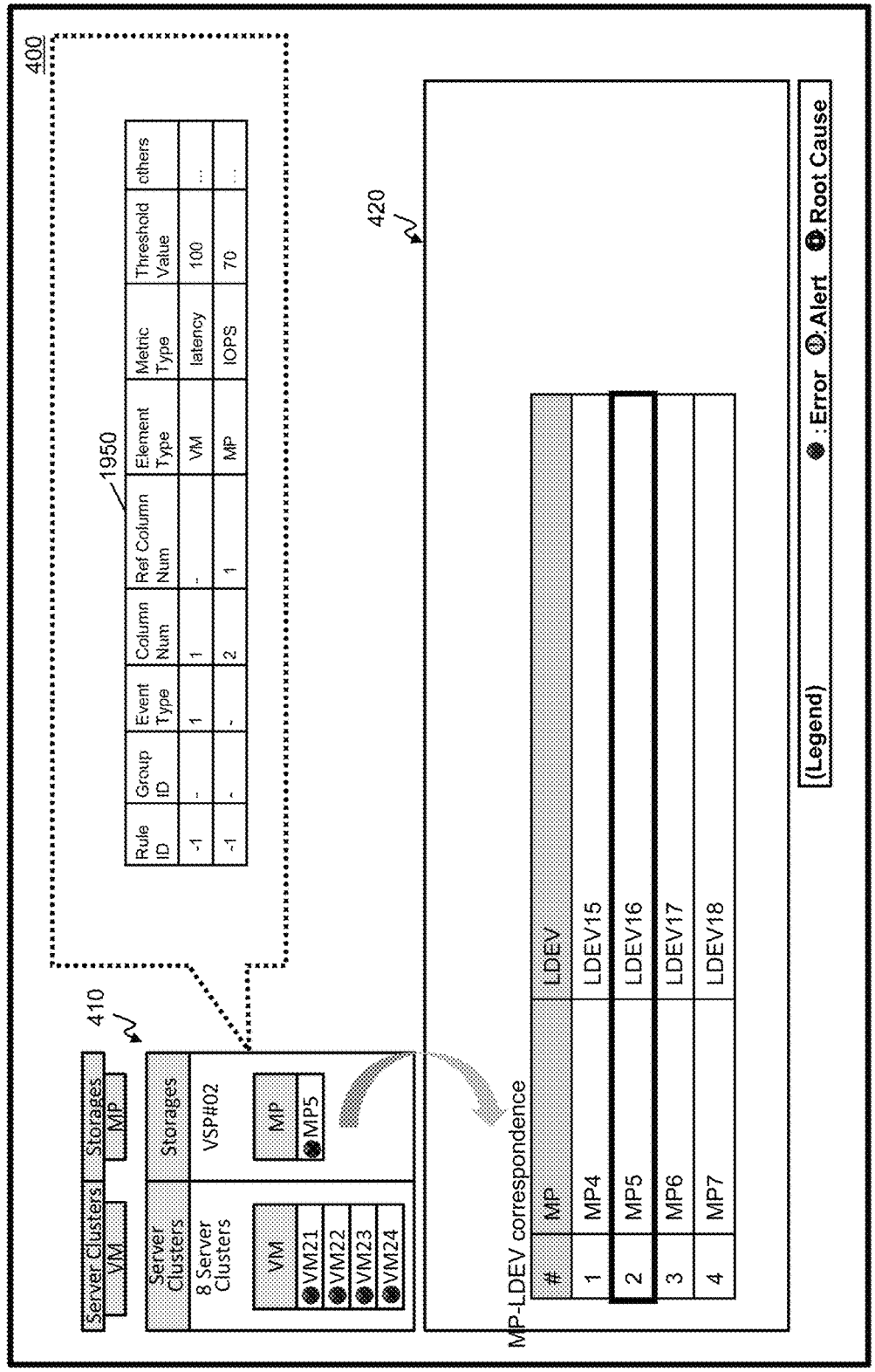
FIG. 5 illustrates an example of the failure investigation screen.

The user performs narrow down operation (user operation) in which the second element type column and subsequent element type columns are narrowed down to only the element type column "MP" in order to investigate the cause of the increase in the IOPS of the "MP5" from the failure investigation screen 400 illustrated in FIG. 4. The display result obtained in response to the narrow down operation is illustrated in FIG. 5. In the failure investigation screen 400 illustrated in FIG. 5, the entry corresponding to the eliminated third element type column "LDEV" is deleted from the temporary template table 1950 by the management server program 541.

The user predicts that the cause of the load of the element "MP5" is one of the LDEVs. Then, the user performs the detail display operation for displaying details including information describing the LDEV that the "MP5" has ownership of. In response to the detail display operation, the management server program 541 displays the details including the information describing the LDEV owned by the "MP5" (for example, a part that includes at least information on the "MP5" out of MP-LDEV correspondence information that is a part of the configuration information 543) in the work space 420 as illustrated in FIG. 5. The user can see from that detail that the "MP5" has ownership of the "LDEV16".

Figure 6:
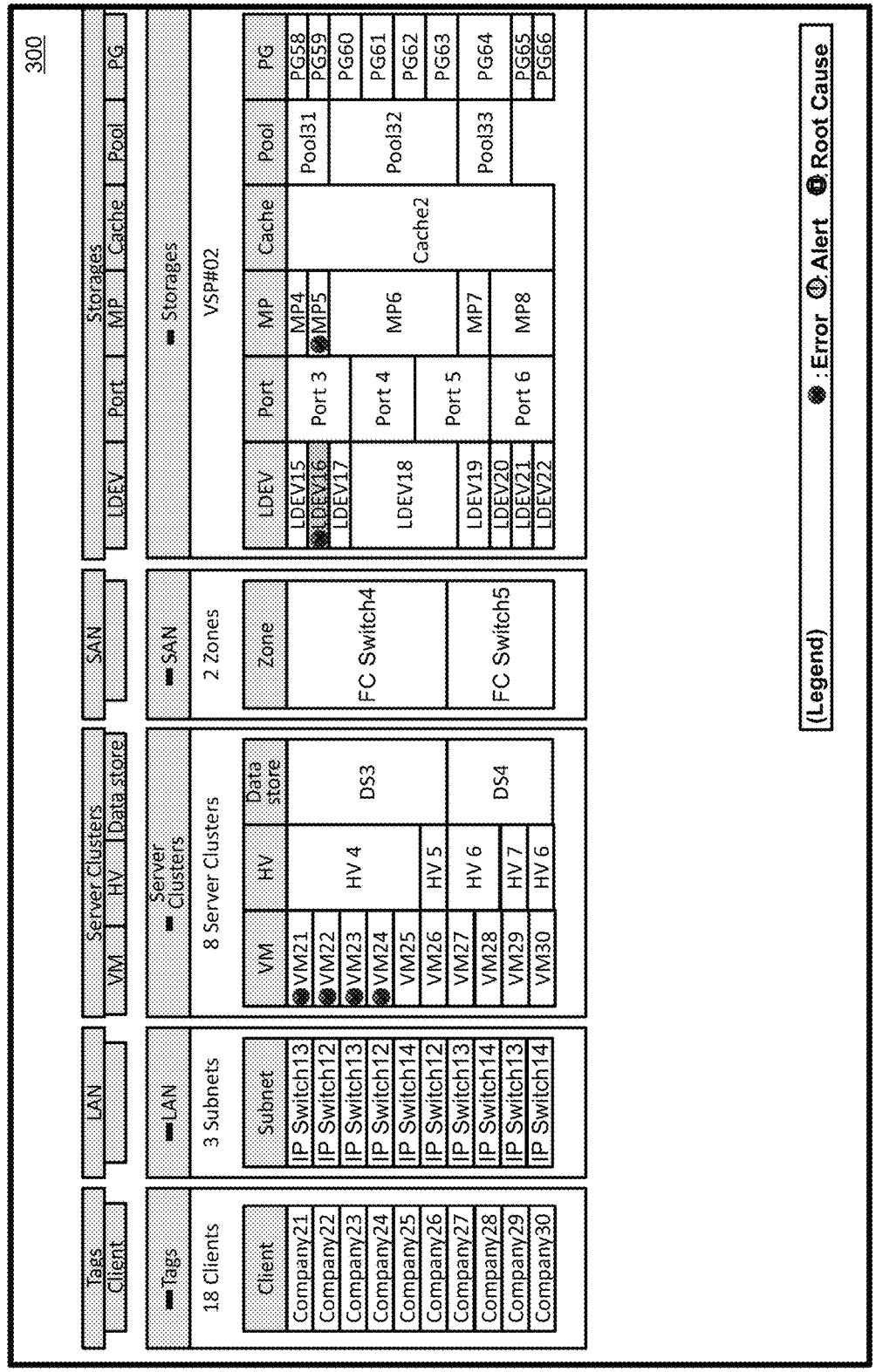
FIG. 6 illustrates an example of the overall configuration screen.
Figure 7:
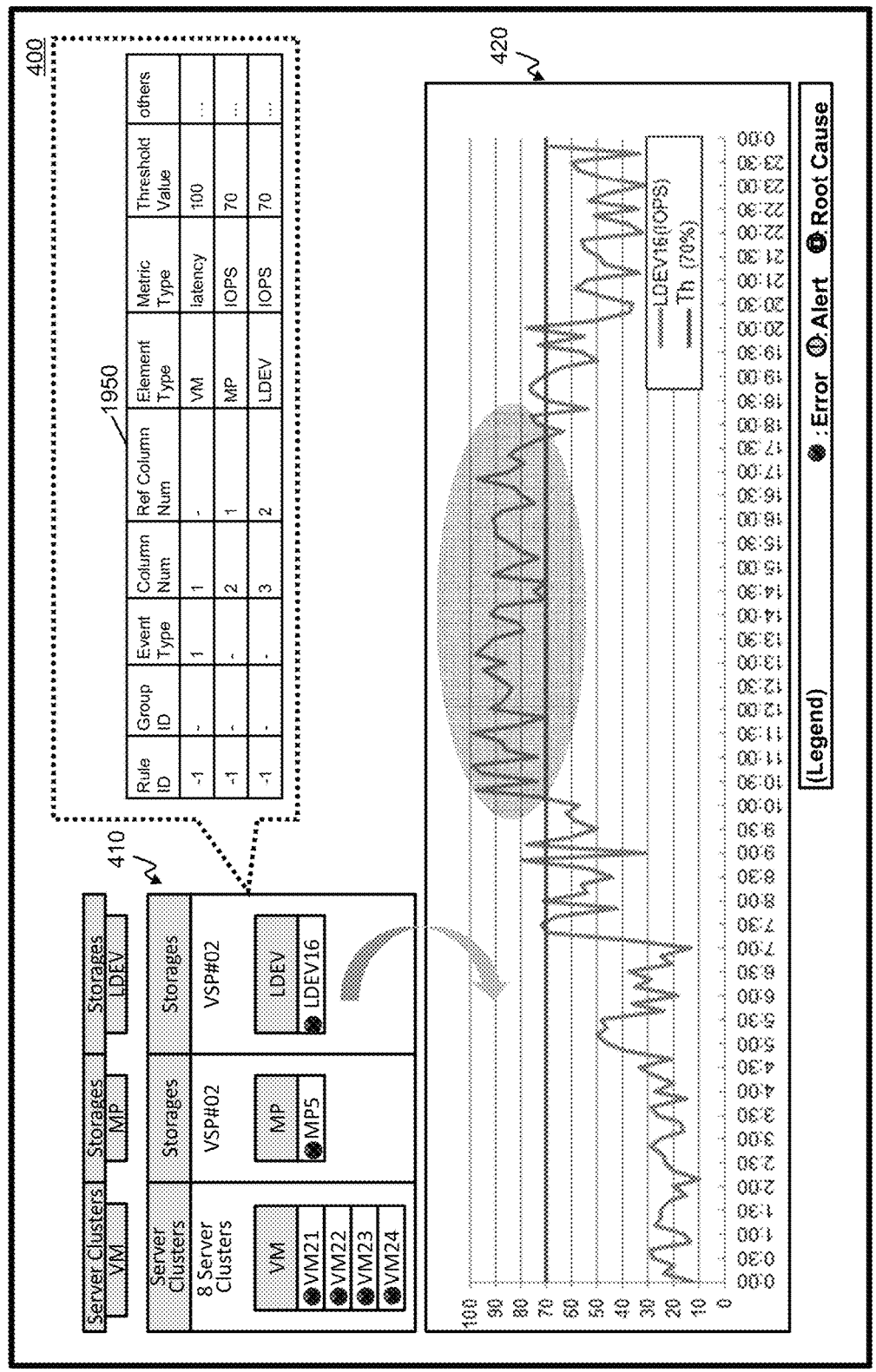
FIG. 7 illustrates an example of the failure investigation screen.

Then, the management server program 541 displays the overall configuration screen 300 as illustrated in FIG. 6 in response to the user operation. The management server program 541 receives the selection of the element object "LDEV16" and column adding operation (user operation). In that case, the management server program 541 displays (adds) the element type column "LDEV" including the selected element object "LDEV16" on the right side of the rightmost element type column "MP" as illustrated in FIG. 7 in response to the column adding operation. In this way, the element type column including the element object that is (for example, empirically) determined by the user that it is preferred to be added is displayed (added) in the column space 410 at any timing the user desires. The temporary template table 1950 is updated as illustrated in FIG. 7 when addition is made to the element type column.

When the management server program receives an instruction to display details on the element "LDEV16", the management server program displays the details on the "LDEV16" in the work space 420. The details include information on a relationship between the time-series variation of the metric value (IOPS) of "LDEV16" and the threshold value, for example. From the information, the user can confirm that the IOPS of the "LDEV16" is increased than its normal state.

Figure 8:
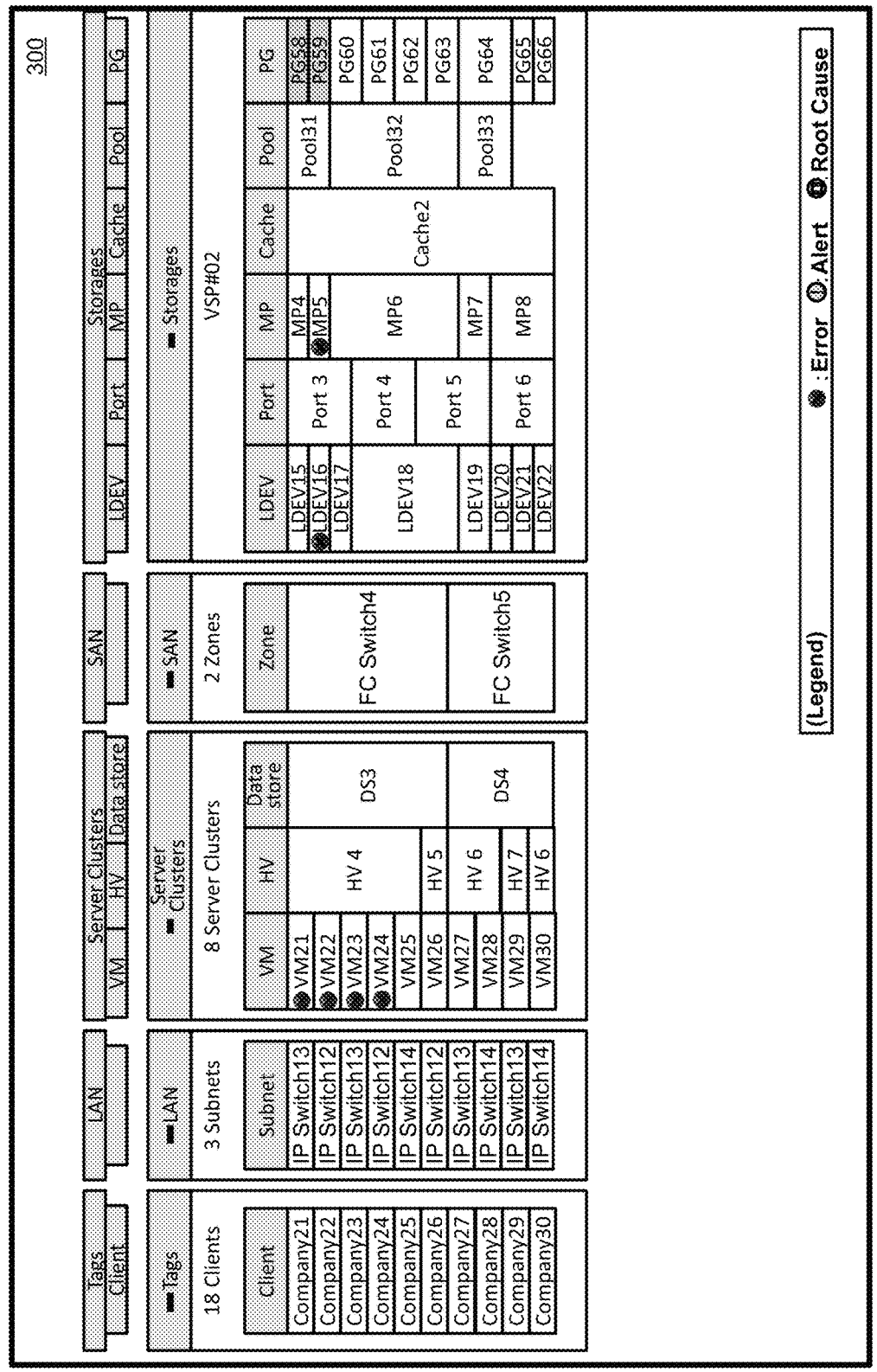
FIG. 8 illustrates an example of the overall configuration screen.

Then, the user performs user operation for displaying the overall configuration screen, to thereby determine the PG relating to the element "LDEV16". The management server program 541 displays the overall configuration screen 300 as illustrated in FIG. 8 in response to the user operation. The user determines that the PG relating to the element "LDEV16" are "PG58" and "PG59" with use of the screen 300 illustrated in FIG. 8. The management server program 541 may display association between the element "LDEV16" and the elements relating to the "LDEV16" (elements belonging to other types). The display of the association may be to change the heights of the element objects so that the height range of the element object "LDEV16" and the height range of the element relating to the "LDEV16" object at least partly overlap each other, or may be to display a connection line between the specified element object "LDEV16" and the element object relating thereto, for example.

Figure 9:
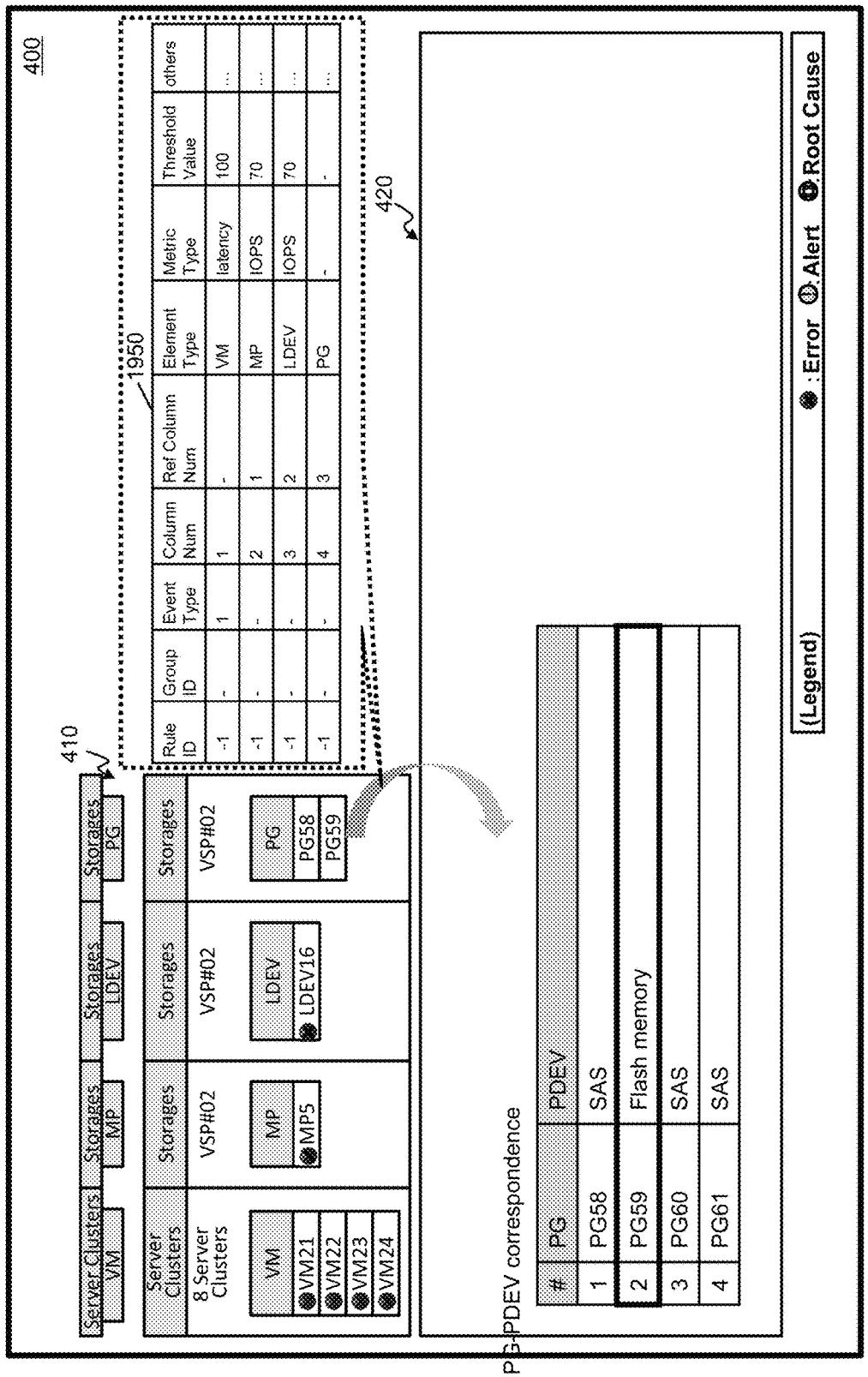
FIG. 9 illustrates an example of the failure investigation screen.

The management server program 541 receives the selection of the element objects "PG58" and "PG59" and the column adding operation (user operation). In that case, the management server program 541 displays (adds) the element type column "PG" including the selected element objects "PG58" and "PG59" on the right side of the rightmost element type column "LDEV" as illustrated in FIG. 9 in response to the operation. The temporary template table 1950 is updated as illustrated in FIG. 9 when the element type column "PG" is added. In the temporary template table 1950 illustrated in FIG. 9, the entry corresponding to the added element type column "PG" is added, but faults have not occurred in the elements "PG58" and "PG59", and hence "Null (–)" is registered as the "metric type" and the "threshold value".

The user looks at the failure investigation screen 400 illustrated in FIG. 9 and (for example, empirically) predicts that the cause of the increase in the IOPS of "LDEV16" is that at least one of the elements "PG58" and "PG59" is a set of a flash memory devices (for example, an SSD (Solid State Drive)). Then, the user performs the detail display operation for displaying the details on the "PG58" and the "PG59". The management server program 541 displays the details on the "PG58" and the "PG59" (for example, a part including at least information on the "PG58" and the "PG59" out of PG-PDEV correspondence information that is a part of the configuration information 543) in the work space 420 as illustrated in FIG. 9 in response to the detail display operation. The user confirms from the detail that the "PG59" is a set of flash memory devices as predicted, in other words, that the cause of the increase in the IOPS of the "LDEV16" is the "PG59".

Figure 10:
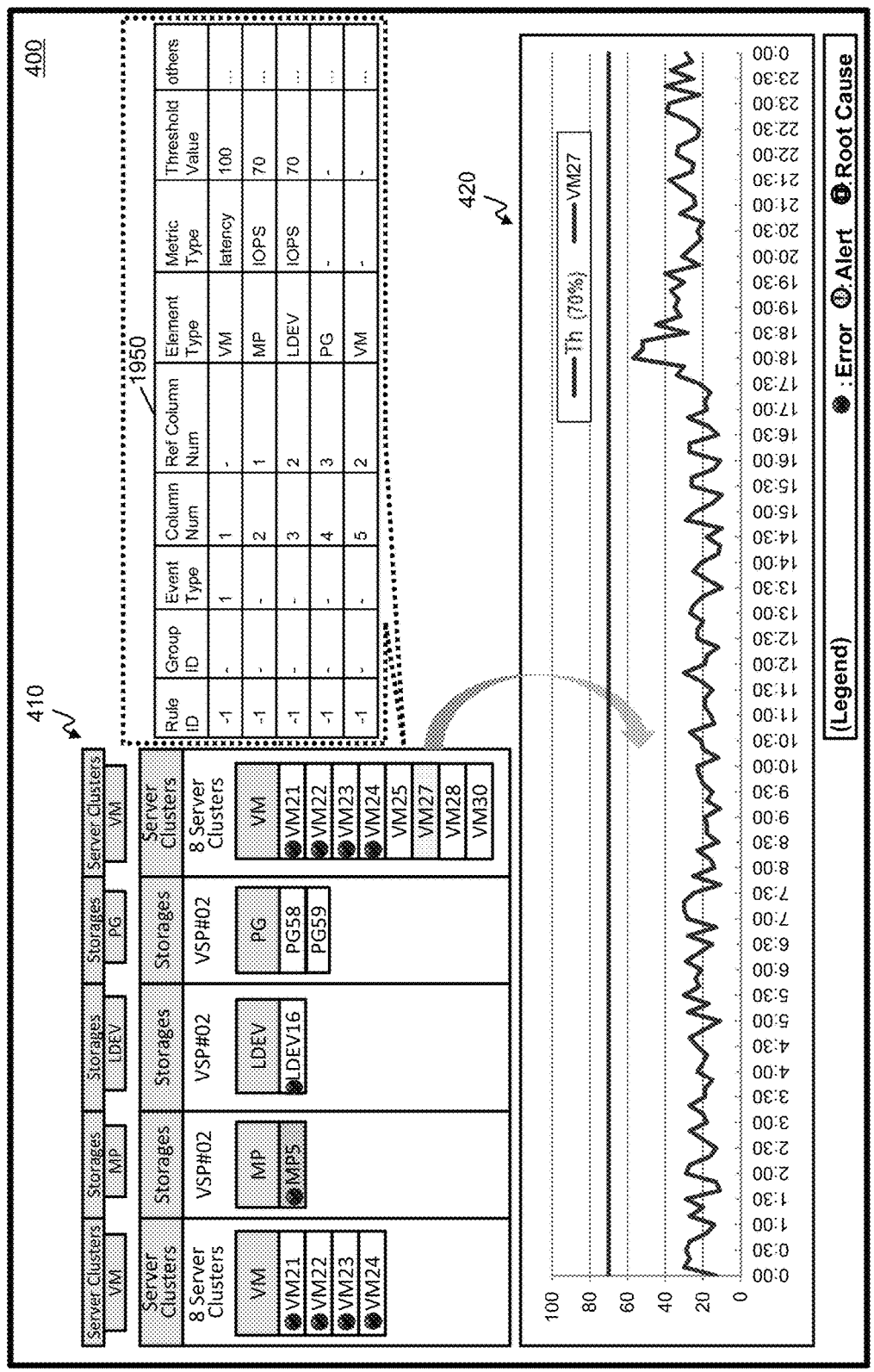
FIG. 10 illustrates an example of the failure investigation screen.

The management server program 541 can receive influence range display operation for displaying the influence range of the element specified by the user. For example, the user performs the influence range display operation in which the "MP5" is specified in order to determine the influence range of the increase in the load of the "MP5" because the user has understood that the "PG58", the "PG59", and the "LDEV16" are causes for the increase of the load in the "MP5". The management server program 541 updates the failure investigation screen 400 as illustrated in FIG. 10 when the management server program 541 receives the influence range display operation in which the "MP5" is specified. Specifically, the management server program 541 adds an element type column on the right side of the rightmost element type column "PG". An element (element object) topologically related to the specified element "MP5" and belonging to the element type corresponding to the added column is displayed in the added element type column. The element (element object) displayed in the added element type column in response to the influence range display operation only needs to be c, and does not need to have an event that is the same as the event that has occurred in the specified element "MP5" occurring therein. The elements corresponding to the object displayed in the added element type column are conceived to be elements influenced by the specified element "MP5". The element type corresponding to the element type column to be added may be one or more, and may be specified by the user or predetermined. In this embodiment, the element type corresponding to the element type column added in response to the influence range display operation is the same as the element type corresponding to the head element type column (the column corresponding to the type to which the element selected first by the user belongs to). In FIG. 10, the element objects of the elements "VM25", "VM27", "VM28", and "VM30" topologically related to the specified element "MP5" are displayed in the added element type column "VM" in addition to the fault elements "VM21" to "VM24" selected first by the user. When the element type column "VM" is added, the temporary template table 1950 is updated as illustrated in FIG. 10. The addition of the element type column "VM" is addition for the influence range determination, and hence "Null" is registered as each of the "metric type" and the "threshold value".

As described above, the element type column including the element topologically related to the selected element (the same event does not need to be occurring) can be added in the column space 410 instead of or in addition to the element type column including only the element in which an event that is the same as the event occurring in the selected element is occurring. In this way, the user can grasp the elements that are be conceived to be influenced by the selected element. In this embodiment, the element type corresponding to the column that is added in response to the influence range display operation and the element type corresponding to the head element type column are the same, but the element objects displayed in the columns are different. As a result, only the element objects that are selected by the user first are displayed in the head element type column "VM", but all the element objects of "VM21" to "VM24", "VM25", "VM27", "VM28", and "VM30" that can be influenced by the "MP5" in which an error is occurring are displayed in the added element type column "VM". Through the display, the elements that are the same type as a focused element and can be influenced by the error can be grasped.

The user can perform the detail display operation in which one element object (for example, "VM27") of the added element type column "VM" is specified. The management server program 541 displays the details on the specified element "VM27" (for example, the time-series variation of the IOPS) in the work space 420 in response to the detail display operation. Whether there is influence on the elements in the influence range can be confirmed. In this way, the user can investigate the details on each of the "VM21" to the "VM24", the "VM25", the "VM27", the "VM28", and the "VM30" that can be influenced by the "MP5" in which an error is occurring.

The management server program 541 can receive the template saving operation (user operation) for saving a template (display rule) in accordance with the display result selected freely by the user. For example, when the management server program 541 receives the template saving operation for the display result of the column space 410 illustrated in FIG. 10 (the display result including five element type columns), the management server program 541 saves the information (all entries) included in the temporary template table 1950 illustrated in FIG. 10 into the template table described later. Then, the management server program 541 may delete the temporary template table 1950.

The fault investigation (without a corresponding template) has been described above. The element selection and column adding operation may be received via the failure investigation screen instead of the overall configuration screen. That is, the element type column may be addable to the column space of the failure investigation screen without displaying the overall configuration screen.

<Fault Investigation (With a Corresponding Template)>

In the description of the "fault investigation (with a corresponding template)", there exists a template (hereinafter a "newly saved template") shown by the temporary template table 1950 illustrated in FIG. 10 as the corresponding template and the configuration information 543 and the monitoring result information 544 is the same as the configuration information 543 and the monitoring result information 544 in the "fault investigation (without a corresponding template)" described above.

Figure 11:
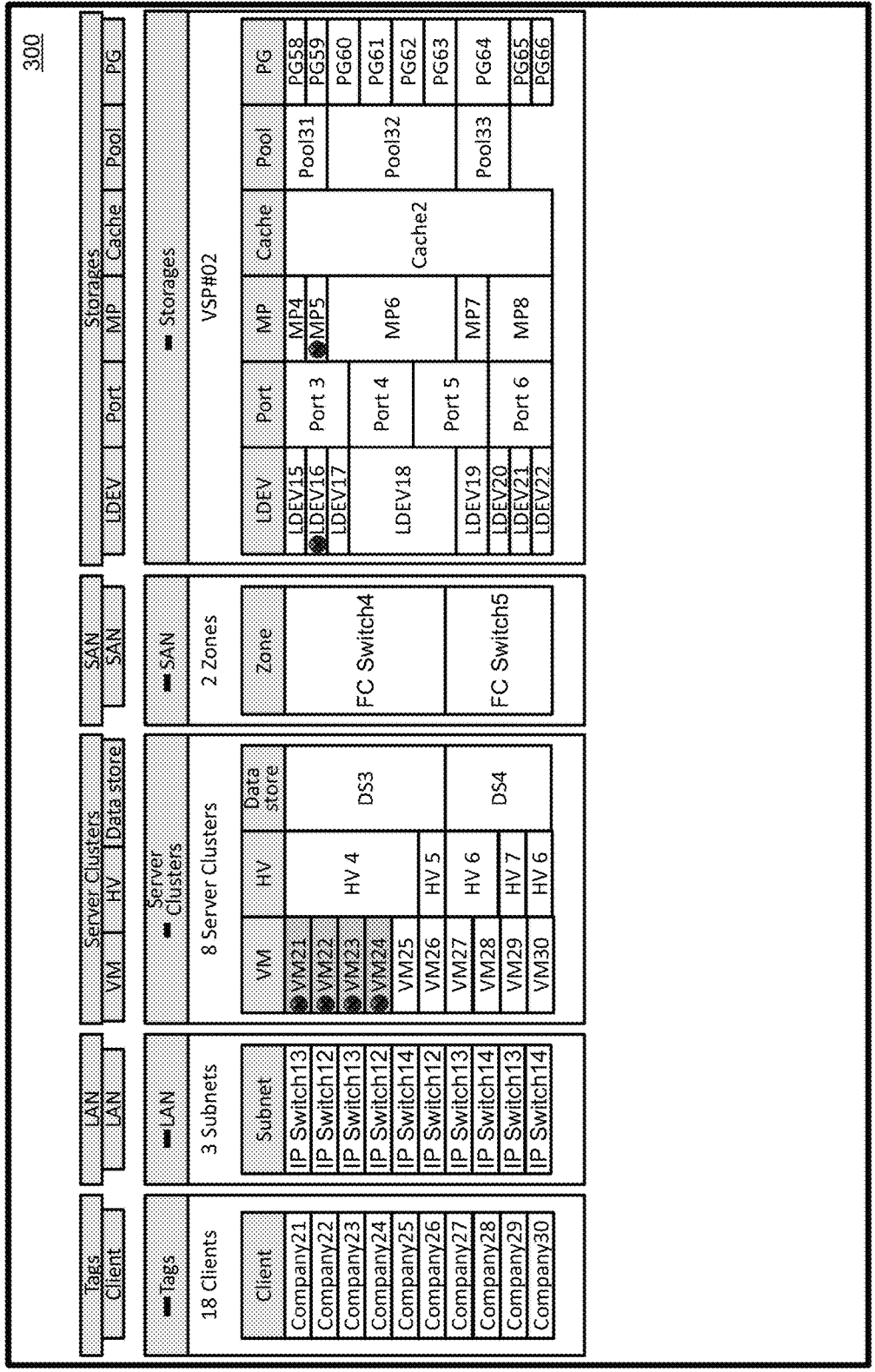
FIG. 11 illustrates an example of the overall configuration screen.
Figure 12:
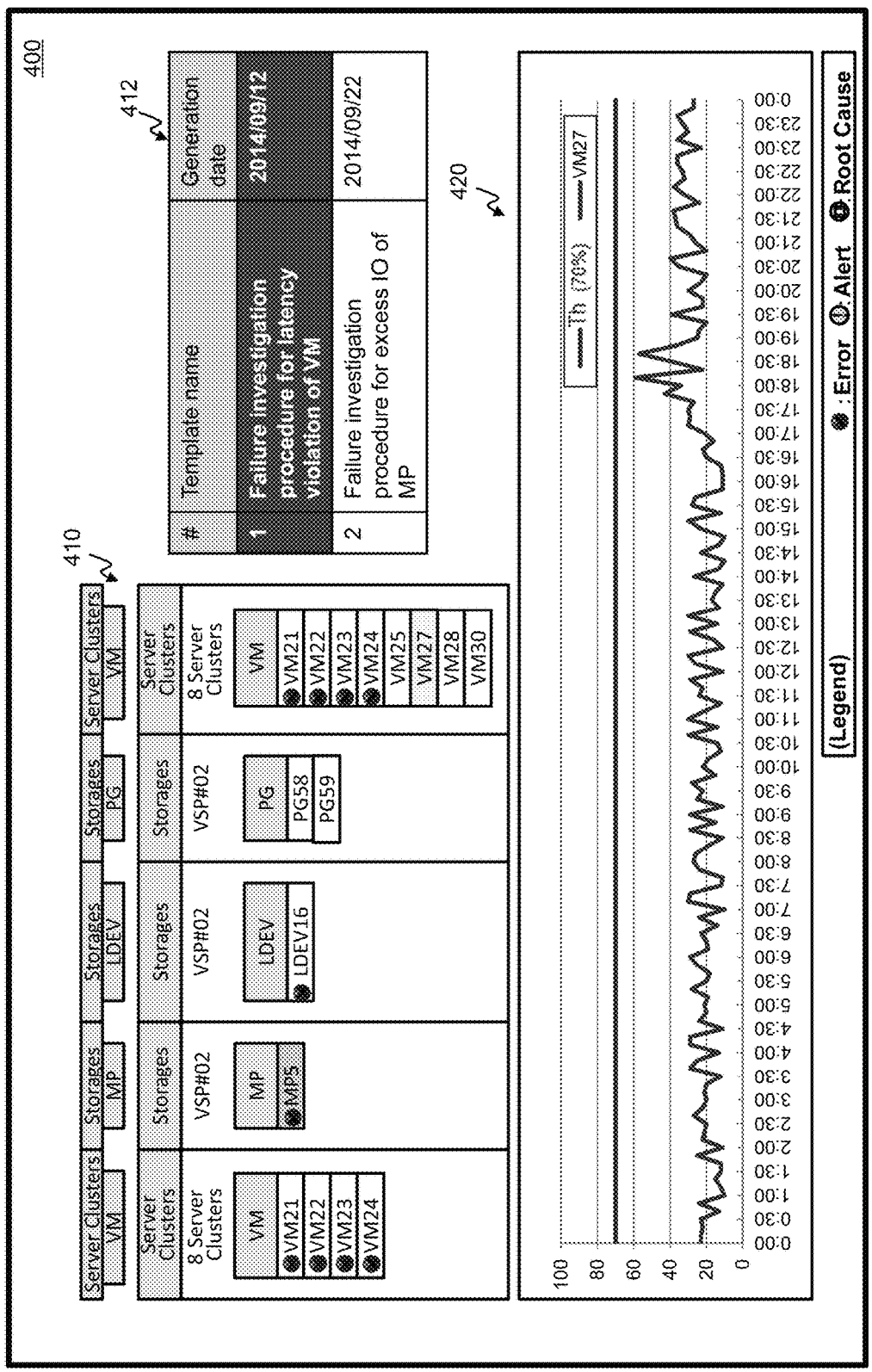
FIG. 12 illustrates an example of the failure investigation screen (template application).

As illustrated in FIG. 11, the overall configuration screen 300 that is the same as that in FIG. 3 is displayed and the management server program 541 receives the selection of the "VM21" to the "VM24" and the column development operation. The attributes of the selected "VM21" to "VM24" (the event type "1" the element type "VM", the metric type "latency", and the threshold value "100") satisfy conditions described in the head entry of a newly generated template (the event type corresponding to the head element type column, the element type, the metric type, and the threshold value). As a result, as illustrated in FIG. 12, the display result of the column space 410 of the failure investigation screen 400 is completely the same as the display result illustrated in FIG. 10. This is because the display result is displayed in accordance with the newly saved template, and the configuration information 543 and the monitoring result information 544 is the same as the configuration information 543 and the monitoring result information 544 in the "fault investigation (without a corresponding template)" described above.

When there are corresponding templates other than the newly saved template (or when there is at least one corresponding template), the management server program 541 may display a corresponding template list 412 on the failure investigation screen 400, for example. The corresponding template list 412 includes one or more entries respectively corresponding to one or more corresponding templates, and each entry may include a template name (an example of identification information) of the corresponding template and a generation date. The management server program 541 may display an entry corresponding to the applied corresponding template out of one or more corresponding templates shown in the list 412 in an emphasized manner (for example, display states such as the color of the entry and the text of the template name and the like may be changed). As a result, the user can grasp the number of templates corresponding to the selected "VM21" to "VM24" and the applied templates.

The management server program 541 may receive the selection of the templates desired by the user from the corresponding template list 412. When a template different from the applied template is selected, the management server program 541 cancels the display of the second column and subsequent columns (columns other than the head column) in the column space 410, and displays the second column and the subsequent columns in the column space 410 in accordance with the selected template. There is more than one method of the investigation (analysis) such as the determination of the fault cause for the selected "VM21" to "VM24". The preferred template for the display result (the head column and one or more element type columns on the right side thereof) with which the fault investigation is to be performed may not be known until the template is actually applied. When the selected template is applied but the desired result cannot be obtained, the operation described in the "fault investigation (without a corresponding template)" needs to be performed, which is a large burden on the user. Therefore, it is highly convenient for the user that the corresponding template to be applied can be switched (can be selected), for example, a display result in which a certain template is applied can be updated to a display result in accordance with another selected template as in this embodiment.

If the configuration information 543 and the monitoring result information 544 are different from the configuration information 543 and the monitoring result information 544 in the "fault investigation (without a corresponding template)" described above, the display result may be different even if the attributes of the selected "VM21" to "VM24" satisfy the conditions described in the head entry of the newly generated template. This is because the template does not define the element that is the display target itself, but defines the conditions of the attributes of the element that is the display target. As a result, for example, an object different from the element object illustrated in FIG. 10 may be displayed or not displayed in any one of element type boxes, and one element object may not be displayed in any one of the element type boxes (for example, an element satisfying the metric type and the threshold value does not exist because all the elements are normal elements).

The management server program 541 can receive various type of user operation for the display result (the failure investigation screen in FIG. 12) to which the template has been applied. For example, when the management server program 541 receives detail display operation in which the "VM27" is specified, the management server program 541 can display details on the "VM27" (details determined from at least one of the configuration information 543 and the monitoring result information 544) in the work space 420 as in the description referring to FIG. 10 (see FIG. 12). When the management server program 541 receives the column adding operation, the management server program 541 can add a column on the right side of the rightmost column "VM". When the management server program 541 receives column narrow down operation, the management server program 541 can delete a specified column (when a column between columns is deleted, a column can be aligned to the left).

When any one of the corresponding templates is applied, the management server program 541 may copy the information on the applied template to the temporary template table 1950. Then, the management server program 541 may update the temporary template table 1950 whenever the display result of the column space 410 is changed in response to the user operation. When the management server program 541 receives the template saving operation, the management server program 541 may overwrite the copied template with the information in the temporary template table 1950 (that is, the applied template itself may be updated) or may register the information in the template table as a new template.

The template does not need to be generated in accordance with the operation described in the "fault investigation (without a corresponding template)" (an example of the user operation in the past related to the column display). For example, one or more templates may be stored in the storage unit 535 in advance. As described in detail later, one template may be newly generated on the basis of two or more existing templates, to be thereby added to the storage unit 535, or a part of the existing templates among two or more existing templates may be updated on the basis of the two or more existing templates.

According to the descriptions of FIG. 3 to FIG. 12, the following effects can be obtained, for example.

That is, in a general topology view, the relationship between the elements is expressed by connection lines, and hence when the number of elements increases, the connection lines become intertwined in a complicated manner and it is difficult to grasp the elements relating to the focused element (one selected element) at a glance. It is also difficult to grasp the elements relating to the focused element (for example, the fault element). A render space for expressing the lines is necessary because the relationship between the elements are expressed by lines, and hence the space for the display targets other than lines decreases. When the number of elements increases, the lines become intertwined in a complicated manner and more render space for expressing the lines is necessary. In the failure investigation screen according to this embodiment, the element type columns are lined up and the number of the element type columns that are the display targets is reduced. As a result, the visibility is enhanced. According to this embodiment, the element type columns are lined up in the lateral direction. That is, the relationship between the elements is expressed in a position relationship in the lateral direction. Therefore, in order to grasp the element relating to the focused element, the user only needs to switch his/her gaze from the element object that is the focused element to a place right next thereto, to thereby grasp the element relating to the focused element (and the element in which an event is occurring that is the same event as the event occurring in the focused element). In particular, in this embodiment, the column of the element type to which the element selected by the user first belongs to is displayed to be the leftmost column, and an element type column including an object corresponding to an element topologically related to that element is sequentially added on the right. As a result, the migration direction of the gaze and the order in which the element type columns are added (analysis order) are in the same direction. This further contributes to the enhancement in the visibility.

In this embodiment, in the failure investigation screen, elements (element objects) displayed in the element type columns other than the head element type column are narrowed down to the elements topologically related to the focused element (and the elements in which an event is occurring that is the same event as the event occurring in the focused element). As a result, the height of the element type column can be reduced. The element type columns are lined up in the lateral direction, and hence the reduction of the height of the element type column contributes to the reserving of the size of the work space placed below (or above) the column space.

In the general topology view, when the number of elements (for example, the number of nodes) is small, it is conceived that the visibility is not bad. In multicolumn display, even if the number of elements is small, the number of columns increases when the number of element types increases, and hence there is a fear in that the visibility may deteriorate. In this embodiment, a template (can be referred to as "filter for display") unique for the multicolumn display is provided and the template is associated with at least a type of an event (alert) occurring in the element displayed in the head column. When an element is selected by the user, the management server program 541 selects a template, in which the element type to which the selected element belongs is an element type corresponding to the head column, and which is associated with the type of the event occurring in the selected element. The management server program 541 displays display target columns and display target elements that are narrowed down through the template. As a result, the visibility can be enhanced even if the number of element types increases in the information system. The display target depends on the selected element and the type of the event occurring in the element, and hence this embodiment can contribute to the accuracy improvement of the event analysis.

This embodiment can be used with the RCA. Specifically, for example, it may be difficult to determine an event root cause (for example, the root cause of the fault) using only the RCA. One reason is because the determination of the events that may occur is formulated into a built-in rule as much as possible in the RCA. In this embodiment, the user can customize the template (display rule). In other words, the experimental rule (knowledge) of the user can be reflected in the template. As a result, for example, it can be expected that the load of the determination of the fault root cause is reduced with the RCA and the load is further reduced by applying the experimental rule of the user (applying the template).

A template (built-in display rule) prepared in common for a plurality of users independent of specific configurations of the information system 100 that is the monitor target can be conceived to be used as the template. However, when the fault investigation is performed, it is preferred to conceive specific individual situations in the information system 100. The template in accordance with the display result in response to the actual user operation is a template in which specific individual situations in the actual information system 100 are conceived and the experimental rule of the user is utilized. By using this template, display beneficial than the built-in display rule can be expected to be performed for the actual information system 100.

Next, specific examples of the user operation in the descriptions of FIG. 3 to FIG. 12 is described.

FIG. 13A illustrates an example of a relationship between the user operation and an operation content. FIG. 13B illustrates an example of a relationship between the user operation and a context menu.

The column development operation includes double-clicking on the object of the element desired to be the target on the overall configuration screen, for example. When the column development operation is performed, the display changes as illustrated in from FIG. 3 to FIG. 4, or from FIG. 11 to FIG. 12, for example. When the column development operation is performed, the management server program 541 executes the processing from FIG. 21 to FIG. 22.

The detail display operation is operation of right-clicking the object of the element desired to be the target on the failure investigation screen so that the context menu illustrated in FIG. 13B is displayed and selecting the "detail reference" in the context menu, for example. When the detail display operation is performed, the work space 420 on the failure investigation screen is displayed in detail as illustrated in FIG. 4, FIG. 7, FIG. 9, and FIG. 12, for example. The type of information displayed in detail may be specifiable by methods such as receiving the selection of the metric type from the user as illustrated in FIG. 13B, for example.

The column adding operation is operation of right-clicking the object of the element desired to be the target on the overall configuration screen (or other screens) so that the context menu illustrated in FIG. 13B is displayed and selecting "add a column on the failure investigation screen" of the context menu, for example. When the column adding operation is performed, the display is switched as illustrated in from FIG. 6 to FIG. 7, or from FIG. 8 to FIG. 9, for example.

The influence range display operation is operation of right-clicking the object of the element of which influence range is desired to be determined on the failure investigation screen so that the context menu illustrated in FIG. 13B is displayed and selecting "confirm the influence range" of the context menu (and the element type desired by the user), for example. When the operation of determining the influence range is performed, the screen is displayed as illustrated in FIG. 10, for example. The element type corresponding to the column to be added in response to the influence range display operation may be the same as an element type corresponding to the head column or may be an element type selected by the user.

The template saving operation is operation of right-clicking on the failure investigation screen so that the context menu illustrated in FIG. 13B is displayed and selecting "save the template" of the context menu, for example.

Template grouping operation is operation of right-clicking on the failure investigation screen so that the context menu illustrated in FIG. 13B is displayed and selecting "group the template" of the context menu, for example.

As described above, the user operation illustrated in FIG. 13A and FIG. 13B is an example. There may be user operation that is not shown. For example, one user operation in this embodiment is "template merge/edit operation". The "template merge/edit operation" is user operation for performing operation in which two or more template tables are input, to thereby output one template table. The output template table may be a template table that is one of the two or more input template tables that is edited (edit result) or may be a new template table (merge result) different from the two or more input template tables.

In the description below, the processing performed by the management server program 541 and an example of information to which reference is made in the processing is described.

The management server program 541 can collect configuration data from all the elements in the information system 100 (for example, all the nodes) or predetermined one or more elements in the information system 100 and construct, for example, tables illustrated in FIG. 14 and FIG. 15 on the basis of the collected configuration data. The tables illustrated in FIG. 14 and FIG. 15 are tables included in the configuration information 543. The management server program 541 can detect a plurality of elements on the basis of the constructed tables.

FIG. 14 illustrates an example of an element list table.

An element list table (Element List Table) 1400 is an example of the information included in the configuration information 543 and is a list of all the elements in the information system 100. Specifically, the table 1400 includes, for each element, an "element ID (Element ID)" that is identification information allocated to the element, an "element name (Element Name)" that is the name of the element, and an "element type (Element Type)" that is the name of the type of the element, for example.

FIG. 15 illustrates an example of an element relationship table.

An element relationship table (Element Relation Table) 1500 is an example of the information included in the configuration information 543 and shows the relationship between the elements. Specifically, the table 1500 includes, for each element, an "element ID (Element ID)" and a "related element ID (Related Element ID)" that is an ID of an element relating to the element, for example.

The tables illustrated in FIG. 14 and FIG. 15 show the topology configuration and the relationship between the element types as illustrated in FIG. 2. When identification names such as "VM #01" and "VSP #02" (for example, common name+identification number) are used, the identification names respectively represent elements, and when common names such as "VM" and "VSP" are used instead of the identification names, the common names respectively represent element types.

The management server program 541 receives a metric from all the elements in the information system 100 (for example, all the nodes) and registers the received metric in an element metric table that is not shown, for example. The element metric table is a table included in the management information 542. The management server program 541 can know the element in which the metric has occurred and the time at which the metric has occurred on the basis of the element metric table.

FIG. 16 illustrates an example of a group table.

The group table 1600 is a table showing a relationship between an ID and a group name of a template group. That is, the group table 1600 includes a "group ID (Group ID)" and a "group name (Group Name)" for each template group.

Template tables having the same selection type (the element type corresponding to the head column) and the same event type may belong to different environments. The "environment" herein may be an environment to which the element belongs and may be an element on a level higher than that of at least one element out of a selection element (for example, the element selected on the overall configuration screen 300) and a related element (the element topologically related to the selection element), for example. The "element on a higher level" herein may be a node (for example, "Storage") including at least one of the selection element and the related element as a component, or a client (for example, "Company21") of which resource is at least one of the selection element and the related element, for example.

FIG. 17 illustrates an example of an element event table.

An element event table (Element Event Table) 1700 is an example of information included in the monitoring result information 544, and shows information on the detected event. The element event table 1700 includes, for each event, an "element ID (Element ID)" that is identification information of the element in which the event has occurred, an "event type (Event Type)" that is an identification number of the type of the event, an "event type name (Event Type Name)" that is a name of the type of the event, an "occurrence time point (Occurrence Time)" that is a time point at which the event has occurred, and an "event message ID (Event Message ID)" that is identification information of an event message.

FIG. 18A illustrates an example of a first template table. FIG. 18B illustrates an example of a second template table. A first template table 1900B1 and a second template table 1900B2 are both template tables. In the description below, a plurality of different template tables may be collectively referred to as a "template table 1900".

The template table (Template Table) 1900 is an example of information included in the management information 542, and shows the template. The template table 1900 includes an entry for each display target column in accordance with the template. That is, each entry corresponds to the element type column displayed in the column space 410 of the failure investigation screen. The entry includes a "rule ID (Rule ID)" that is identification information of the template, a "group ID (Group ID)" that is identification information of the template group to which the template belongs, an "event type (Event Type)" that is an identification number of the event type associated with the template, a "column number (Column Num)" that is a number of the column corresponding to the entry, a "referred column number (Ref Column Num)" that is a number of a referred column (a column adjacent to the left side), an "element type (Element Type)" that is a type of the element corresponding to the column, a "metric type (Metric Type)" that is the type of the metric determined to be an error in the element corresponding to the column, a "threshold value (Threshold Value)" that is a threshold value used in the determination of an error, and "Others" including information such as the template name and the template generation date allocated to the template table. In this embodiment, the same group ID is configured for the plurality of different template tables 1900 belonging to the same group name (see FIG. 16) (the "group name" is an example of an environment type). The template name may be a name input by the user in the template saving processing performed in response to the template saving operation (or a name determined by the management server program on the basis of the content of the temporary template table) and the template generation date may be the execution date of the template saving processing or the latest update date of the temporary template table 1950. The corresponding template list 412 illustrated in FIG. 12 may be generated and displayed on the basis of the "Others" of the template table 1900. The "Others" may include environment detail information corresponding to the template table 1900 for each environment type to which the template table 1900 belongs. The environment detail information is information on the details of the environment of the corresponding environment type and may be a product name of the node, for example. The method of associating the template table 1900 and the environment detail information with each other is not limited to the method including the "Others" in the environment detail information.

One new template table can be output as a result of operation based on (inputting) two or more template tables 1900.

Figures 19A, 19B:
FIG. 19A illustrates a template table as an AND operation result of the template tables in FIG. 18A and FIG. 18B.
FIG. 19B illustrates a template table as an OR operation result of the template tables in FIG. 18A and FIG. 18B.

FIG. 19A illustrates a template table 1900P as an AND operation result of the template tables 1900B1 and 1900B2.

The template table 1900P is an example of the template table newly generated as a result of AND operation in which the two tables 1900B1 and 1900B2 are input. The template table 1900P includes only the same entries among the entries of the two tables 1900B1 and 1900B2. Specifically, the "same entries" are entries of which relative entry order and element types are the same. "The relative entry order is the same" means that the result of comparison between a reference entry and the entry order is the same when the reference entry is the same. Specifically, in each of the tables 1900B1 and 1900B2 in FIG. 18A and FIG. 18B, there are element types "VM", "HV", "FC Switch", and "LDEV" and the sequence orders are the same. Thus, the relative entry order of the element types "VM", "HV", "FC Switch", and "LDEV" are the same. More specifically, for example, when the "HV" is the reference, the relative element order of the "FC Switch" is the same for both the tables 1900B1 and 1900B2 besides the different element types "DS" and "SSD". Therefore, as illustrated in FIG. 19A, the template table 1900P includes four entries respectively corresponding to the element types "VM", "HV", "FC Switch", and "LDEV" that are in common in the two tables 1900B1 and 1900B2.

However, a rule ID "3" that is different from rule IDs "1" and "2" respectively corresponding to the two tables 1900B1 and 1900B2 is allocated for the rule ID associated with the template table 1900P. This is because the template table 1900P is a table of a new template. The group ID and the event type associated with the template table 1900P are a group ID and an event type associated with one table selected from the two tables 1900B1 and 1900B2. The table selected from the two tables 1900B1 and 1900B2 is determined in accordance with a predetermined policy (for example, the one having the smallest rule ID). The description of the rule ID, the group ID, and the event type in this paragraph may be applied to other operation instead of or in addition to the AND operation. Therefore, in the below description of FIG. 19B, FIG. 20A, and FIG. 20B, the description of the rule ID, the group ID, and the event type associated with the newly generated template table is omitted.

FIG. 19B illustrates a template table 1900Q as an OR operation result of the template tables 1900B1 and 1900B2.

The template table 1900Q is an example of the template table newly generated as a result of merging the two tables 1900B1 and 1900B2. The template table 1900Q also includes the entries of the element types only existing in one table of the two tables 1900B1 and 1900B2 besides the same entries out of the entries in the two tables 1900B1 and 1900B2. Specifically, the template table 1900Q includes the entry of the element type "DS" only in the table 1900B1 and the entry of the element type "SSD" only in the table 1900B2 besides the four entries respectively corresponding to the element types "VM", "HV", "FC Switch", and "LDEV" that are in common for the two tables 1900B1 and 1900B2.

FIG. 20A illustrates a template table 1900R as a replace operation result of the template tables 1900B1 and 1900B2.

The template table 1900R is an example of a template table obtained after editing the table 1900B1 out of the two tables 1900B1 and 1900B2. In the template table 1900R, the entry different between the tables 1900B1 and 1900B2 (the entry of which element type is different) out of the entries in one table 1900B1 is replaced by the entry of the other table. Specifically, the entry of the element type "DS" in the table 1900B1 is replaced by the entry of the element type "SSD" in the table 1900B2.

FIG. 20B illustrates a template table 1900S as a delete calculation result of the template table 1900B1.

The template table 1900S is an example of a template table obtained after the table 1900B1 is edited. In the template table 1900S, the entry of the element type "DS" is deleted from the table 1900B1.

Figure 21:
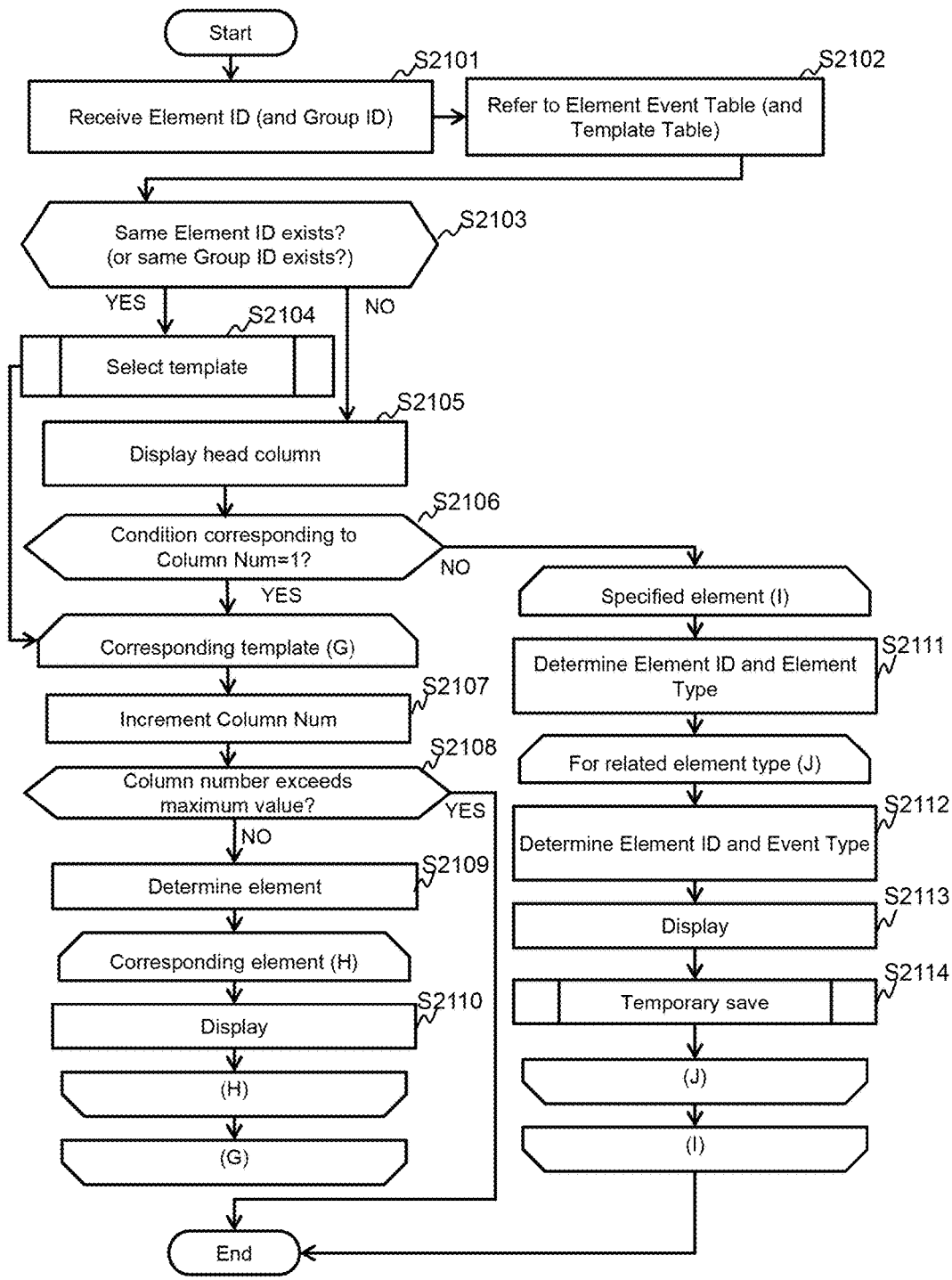
FIG. 21 illustrates an example of a flow of column development processing.

FIG. 21 illustrates an example of a flow of a column development processing.

The column development processing is processing performed in response to the column development operation.

Figure 22:
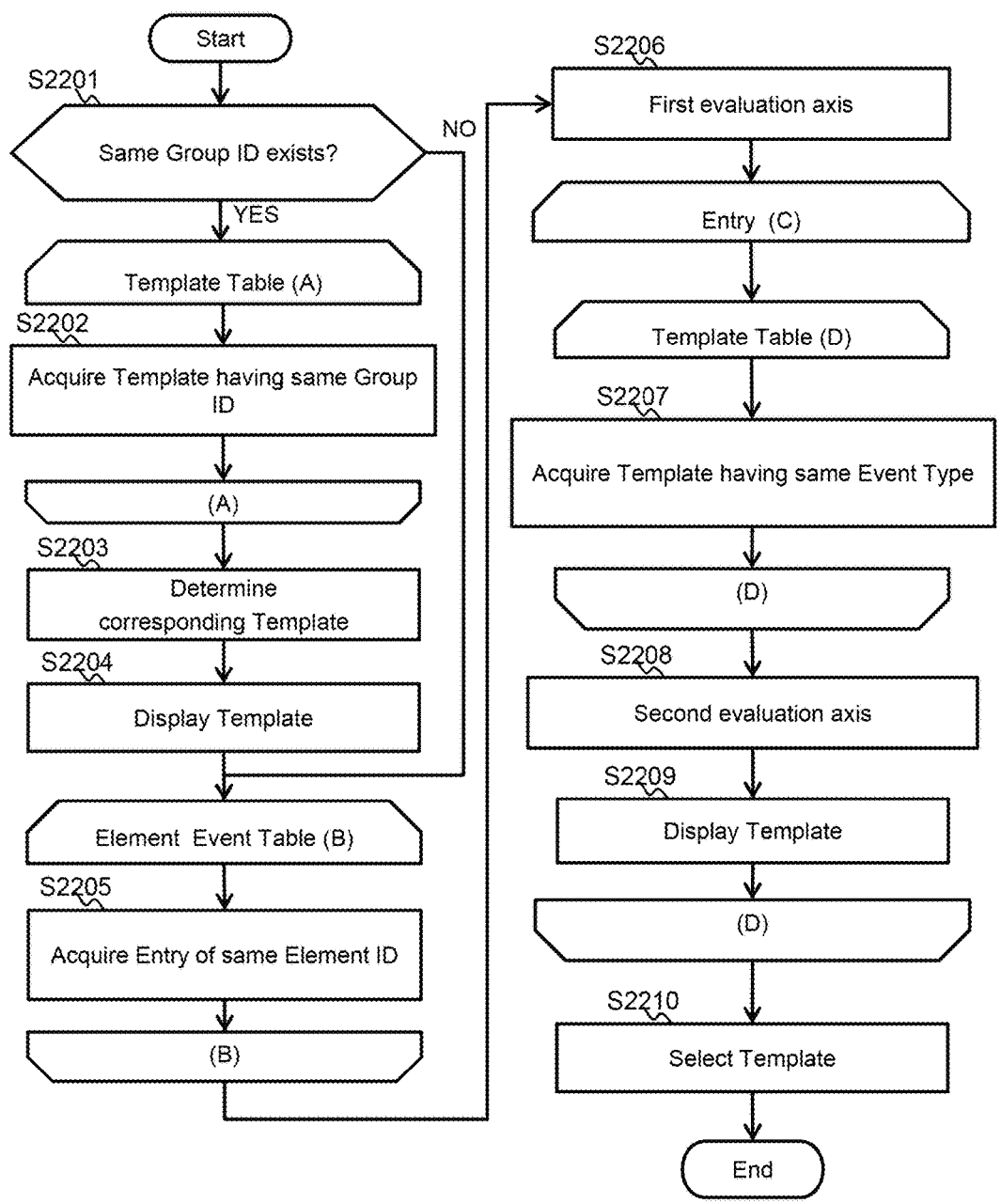
FIG. 22 illustrates an example of a flow of template selection processing.

The management server program 541 receives at least the element ID (the element ID specified in the column development operation) out of the element ID and the group ID (the group ID input by the user) (S2101). In the description of FIG. 21 and FIG. 22, the element ID received in S2101 is referred to as a "selection element ID" and the element described by the selection element ID is referred to as a "selection element". The group ID received in S2101 is referred to as a "selection group ID" and the template group described by the selection group ID is referred to as a "selection group".

The management server program 541 refers to at least the element table 1700 out of the element event table 1700 and the template table 1900 with use of at least the selection element ID out of the selection element ID and selection group ID as a key (S2102). The management server program 541 performs at least a first determination out of the first determination of determining whether there is an element ID that is the same as at least one selection element ID in the element event table 1700, and a second determination of determining whether there is a template table 1900 in which there is a group ID that is the same as the selection group ID (S2103). When at least one result of the first determination and the second determination is positive, the determination result of S2103 is positive, and when both the results of the first determination and the second determination are negative, the determination result of S2103 is negative.

When the result of S2103 is negative (S2103: NO), the management server program 541 displays a failure investigation screen and displays the element object of the selection element in the first column (the first column from the left) (S2105). Next, the management server program 541 determines whether all the selection elements satisfy the conditions (the element type, the metric type, and the threshold value) of the entry of which column number is 1 in any template table 1900 (S2106).

When the determination result of S2106 is positive (S2106: YES), it means that there is a template that can be applied (corresponding template), and hence the management server program 541 performs S2107 to S2110 (loop G) for the entry corresponding to all the columns of the template corresponding to a specification rule ID. The "specification rule ID" is herein a rule ID of a template that is the processing target in a plurality of templates satisfying the conditions of S2106. The specification rule ID may be the minimum rule ID in the plurality of templates satisfying the conditions of S2106, for example. The specification rule ID may be a rule ID specified by the user (for example, a rule ID of a template specified in the template list 412 on the failure investigation screen in FIG. 12).

The management server program 541 increments (+1) a variable "column number" (S2107). A variable "reference column number" is the column number before the incrementation.

Next, the management server program 541 determines whether the variable "column number" has exceeded the maximum value (S2108).

When the determination result of S2108 is positive (S2108: YES), the management server program 541 exits the loop G, to thereby end the processing. When the determination result of S2108 is negative (S2108: NO), the management server program 541 determines an entry corresponding to the variable "column number" and the variable "reference column number" in the template of the specification rule ID, and determines an element corresponding to the element type of the entry and satisfying the conditions (the metric type and the threshold value) of the entry (S2109). When the metric type and the threshold value are not configured in the entry of the template, an element corresponding to the element type of the entry is determined.

Next, the management server program 541 executes S2110 for each of the determined elements (loop H). One element is described as an example.

The management server program 541 displays the element object of the element that is the target in the element type column corresponding to the variable "the column number" on the failure investigation screen (S2110). When the element type column corresponding to the column number is not displayed on the failure investigation screen yet, the management server program 541 displays the element type column corresponding to the column number.

When the determination result of S2106 is negative (S2106: NO), it means that there are no templates that can be applied, and hence the management server program 541 executes S2111 to S2114 for each of all the selection elements (loop I). Now, one selection element (referred to as a "target selection element" in the description of FIG. 23) is described as an example.

The management server program 541 acquires the element ID and the element type of the element relating to the target selection element from the element relationship table 1500 (S2111). Next, the management server program 541 executes S2112 to S2114 for each element type to the relating element which belongs (loop J). Now, one relating element (referred to as a "target related element" in the description of FIG. 23) is described as an example.

The management server program 541 refers to the element event table 1700. When an event is occurring in the target related element, the management server program 541 acquires the element ID and the event type of the target related element (S2112), to thereby display the target related element in the second column on the failure investigation screen (S2113) and execute the temporary template saving processing for the target related element (S2114). The temporary template table 1950 is saved by the temporary template saving processing. Specifically, for example, in the temporary template saving processing, the management server program 541 adds entries including a rule ID "−1", a value of the variable "column number", a value of the variable "reference column number", the acquired element type, the metric type, and the threshold value in the temporary template table 1950. The head entry includes the event type of the event that has occurred in the element corresponding to at least one element ID among the element IDs received in S2101. The head entry may include a group ID specified by the user or a group ID corresponding to the group name to which the element type corresponding to the head column belongs to (the group ID determined by referring to the group table 1600 with use of the element type corresponding to the head column as a key).

When the result of S2103 is positive (S2103: YES), the management server program 541 performs template selection processing (FIG. 22) (S2104). The loop G is performed for the template table selected in the template selection processing.

FIG. 22 illustrates an example of a flow of the template selection processing.

In the template selection processing, at least one of first subprocessing of acquiring the template tables 1900 from the selection group and second subprocessing of lining up the template tables 1900 associated with the event type of the event that has occurred in at least one selection element in a predetermined evaluation axis order is executed (at least the second subprocessing in this embodiment). In the template selection processing, one or more template tables 1900 are selected by the user or the management server program 541 on the basis of the result of at least one subprocessing out of the first subprocessing and the second subprocessing.

The first subprocessing is processing including S2201 to S2204. Specifically, the first subprocessing is as follows.

When there is a template table 1900 in which a group ID that is the same as the selection group ID exists (S2201: YES), the management server program 541 acquires the template table 1900 in which the group ID that is the same as the selection group ID exists (loop A (S2202)), to thereby select the corresponding template table 1900 from the acquired template group 1900 (that is, the selection group) (S2203). The management server program 541 displays the template table 1900 selected in S2203 (S2204).

The "corresponding template table" herein is a template table relating to one or more selection elements, and more specifically, a template table corresponding to the environment to which at least one of one or more selection elements and the related element thereof belongs, for example. "The environment to which at least one of one or more selection elements and the related element thereof belongs to" can be determined by referring to the configuration information 543 including the element list table 1400 and the element relationship table 1500. The "environment" may be a node including at least one of one or more selection elements and the related element thereof as components. More specifically, there is described a case in which the selection element is "VM21", the environment type corresponding to the selection element (group name) is "FC Switch", and there are a template table A including "FC Switch4" and a relationship node thereof and a template table B including "FC Switch5" and a relationship node thereof for the "FC Switch", for example. In this case, the FC Switch relating to the selection element "VM21" is the "FC Switch4" in FIG. 2. Therefore, in S2203, the template table A is selected as the corresponding template table out of the template tables A and B. In S2204, the selected corresponding template table is displayed.

S2204 may be omitted.

When there are a plurality of corresponding template tables in S2203, a list of the plurality of selected corresponding template tables may be displayed in S2204.

Further, when there are a plurality of corresponding template tables in S2203, the management server program 541 may line up the plurality of corresponding template tables in the evaluation axis order. In S2203, the management server program 541 may select at least the head corresponding template table among the plurality of corresponding template tables lined up in the evaluation axis order. In S2204, a list of the plurality of corresponding template tables lined up in the evaluation axis order may be displayed.

The second subprocessing is performed after the first subprocessing described above. However, executing order of the subprocessing is not limited thereto. The second subprocessing may be performed first.

The second subprocessing is processing including a loop B (S2205), S2206, and a loop C (a loop D (S2207), S2208, and S2209). Specifically, the processing is as the follows.

The management server program 541 acquires, for each selection element ID, an entry (record) including an element ID that is the same as the selection element ID from the element event table 1700 (the loop B (S2205)). Next, the management server program 541 lines up the acquired entries in an order in accordance with a first evaluation axis (S2206).

Next, the management server program 541 performs, for each entry, the loop D (S2207), S2208, and S2209 from the head entry of the entries lined up in S2206 (the loop C), for example. Now, one entry is described as an example. The management server program 541 acquires all the template tables associated with the event type described by the entry (the loop D (S2207)). Then, the management server program 541 lines up the template tables acquired in the loop D (S2207) in an order in accordance with a second evaluation axis (S2208), to thereby display a list of the lined-up template tables (S2209). The second evaluation axis may be the same as or different from the first evaluation axis.

Lastly, the management server program 541 receives selection of one or more template tables of the template table displayed in S2204 and the template table displayed in S2209 from the user (S2210). The template table may be manually selected as described above, or may be automatically selected by the management server program 541. The template table selected in S2210 is the template table selected in the template selection processing.

The flow of the template selection processing has been described above.

In the template selection processing, the corresponding template table determined in the first subprocessing may be automatically selected in S2210, or the second subprocessing may be skipped when there is at least one corresponding template table in the first subprocessing. This is because the selection group ID is a template candidate group manually specified by the user, and hence it can be said that it is preferred to prioritize the selected template table from the template candidate group.

In the template selection processing, the group ID may be optionally received. That is, the group ID does not need to be received.

At least one of the first evaluation axis and the second evaluation axis may be determined in advance, or may be an evaluation axis manually selected by the user (or automatically selected in accordance with a predetermined policy) from a plurality of the evaluation axes. An evaluation axis that may be at least the second evaluation axis of the first evaluation axis and the second evaluation axis (the evaluation axis for lining up the template tables) may be any one of the following (R1) to (R6). In the description of this embodiment, a first time point is in the past (old) compared to a second time point when the second time point is "earlier" than the first time point, and the first time point is in the future (new) compared to the second time point when the second time point is "later" than the first time point.

(R1) The Event Occurrence Time Point

When this evaluation axis employed, the template tables are lined up in order from the template table in which the time point at which the event of the associated event type has occurred is the earliest. Therefore, the head template table is a template table associated with the event type of the event of which time point of occurrence is the earliest. According to this evaluation axis, analysis (for example, the analysis of the root cause of the event) can be expected to start early for an event of which occurrence time point is early.

(R2) The Priority Order of the Event Type

When this evaluation axis is employed, the template tables are lined up in order from the template table in which the priority order of the associated event type is the highest. Therefore, the head template table is a template table associated with the event type of which priority order is the highest. According to this evaluation axis, analysis can be expected to start early for the event of which priority order of the event type thereof is high.

(R3) The Order of the Generation of the Template Table

When this evaluation axis is employed, the template tables are lined up in order from the template table of which time point of generation is the latest. Therefore, the head template table is the template table that is most recently generated. According to this evaluation axis, the template table expected to be the most correct can be expected to be selected.

(R4) The Selection History of the Template Tables

According to this evaluation axis, the sequence order of the template tables is controlled by the so-called learning function based on the selection history of the template tables. When this evaluation axis is employed, the template tables are lined up in order from the template table that is most selected in a predetermined period, or the template table of which most recent time point of selection is the latest, for example. Therefore, the head template table is the most selected template table or the most recently selected template table, for example. According to this evaluation axis, the template table expected to be the most correct can be expected to be selected from the selection history of the template tables.

(R5) The Event Element Ratio

The "event element" is an element in which an event is occurring among the selection elements. The "event element ratio" is the ratio of the number of event elements to the number of selection elements. According to this evaluation axis, the template tables are lined up in order from the template table of which event element ratio is the highest. Therefore, the head template table is the template table of which event element ratio is the highest. According to this evaluation axis, the template table of which event element ratio is high can be expected to be selected.

(R6) The Number of Event Elements

According to this evaluation axis, the template tables are lined up in order from the template table having the largest number of event elements. Therefore, the head template table is the template table having the largest number of event elements. According to this evaluation axis, the template table having the largest number of event elements can be expected to be selected.

Figure 23:
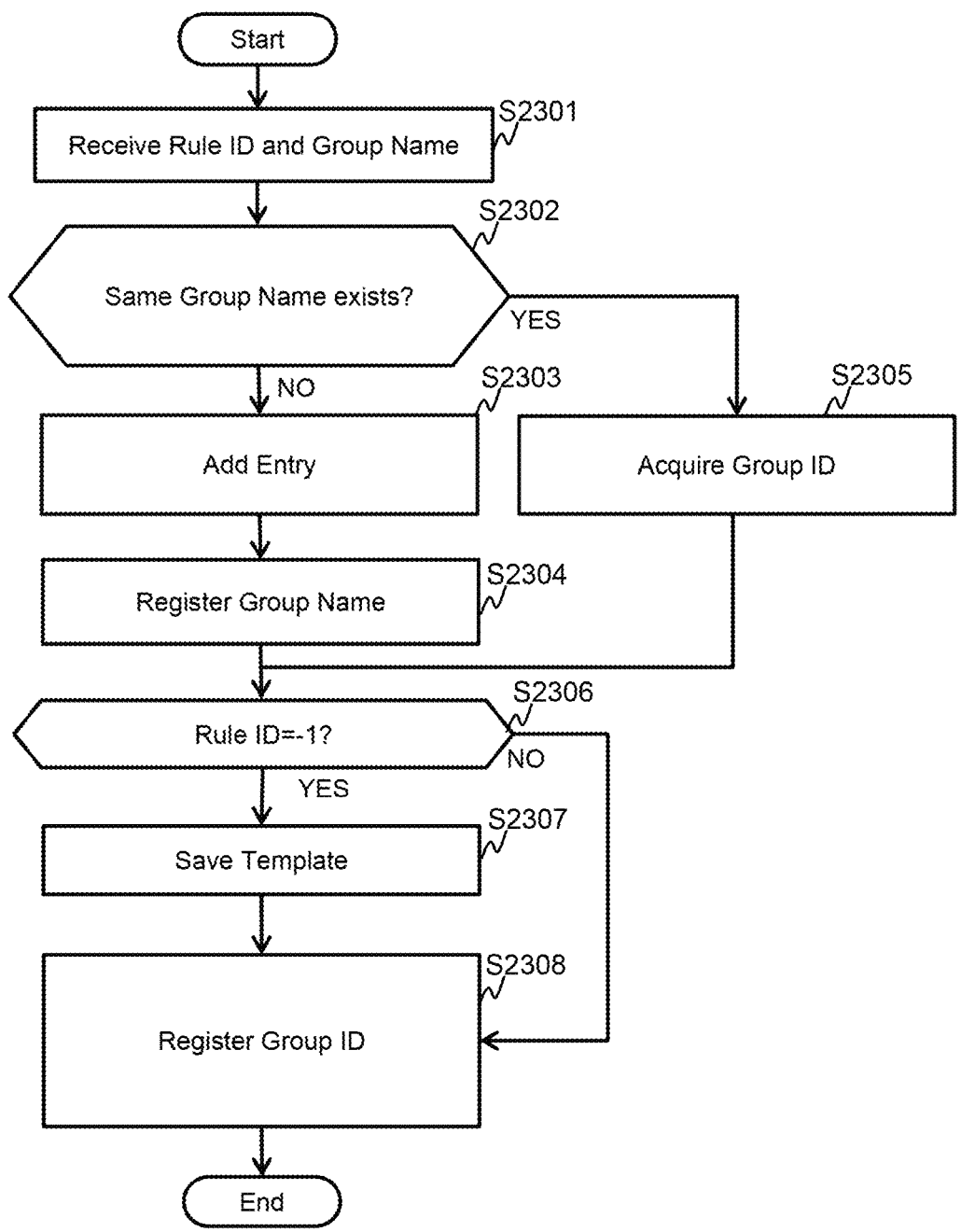
FIG. 23 illustrates an example of a flow of template group generation processing.

FIG. 23 illustrates an example of a flow of template group generation processing.

The management server program 541 receives the rule ID and the group name (S2301). When there are no group names that are the same as the received group name in the group table 1600 (S2302: NO), the management server program 541 adds an entry having a new group ID in the group table 1600 (S2303), to thereby register the received group name in the entry (S2304). When there is a group name that is the same as the received group name in the group table 1600 (S2302: YES), the management server program 541 acquires the group ID corresponding to the received group name from the group table 1600 (S2304).

When the received rule ID=−1 is not satisfied (S2306: NO), the management server program 541 registers the group ID acquired in S2303 or S2305 in the template table 1900 including the received rule ID (S2308). When the received rule ID=−1 is satisfied (S2306: YES), the management server program 541 saves the temporary template as a template (S2307), to thereby perform S2308.

Now, an example of processing of outputting one template table as a result of operation in which two or more template tables are input is described. In this embodiment, two template tables are input. In the description below, the two template tables (templates) serving as inputs are referred to as a "template 1" and a "template 2".

Figure 24:
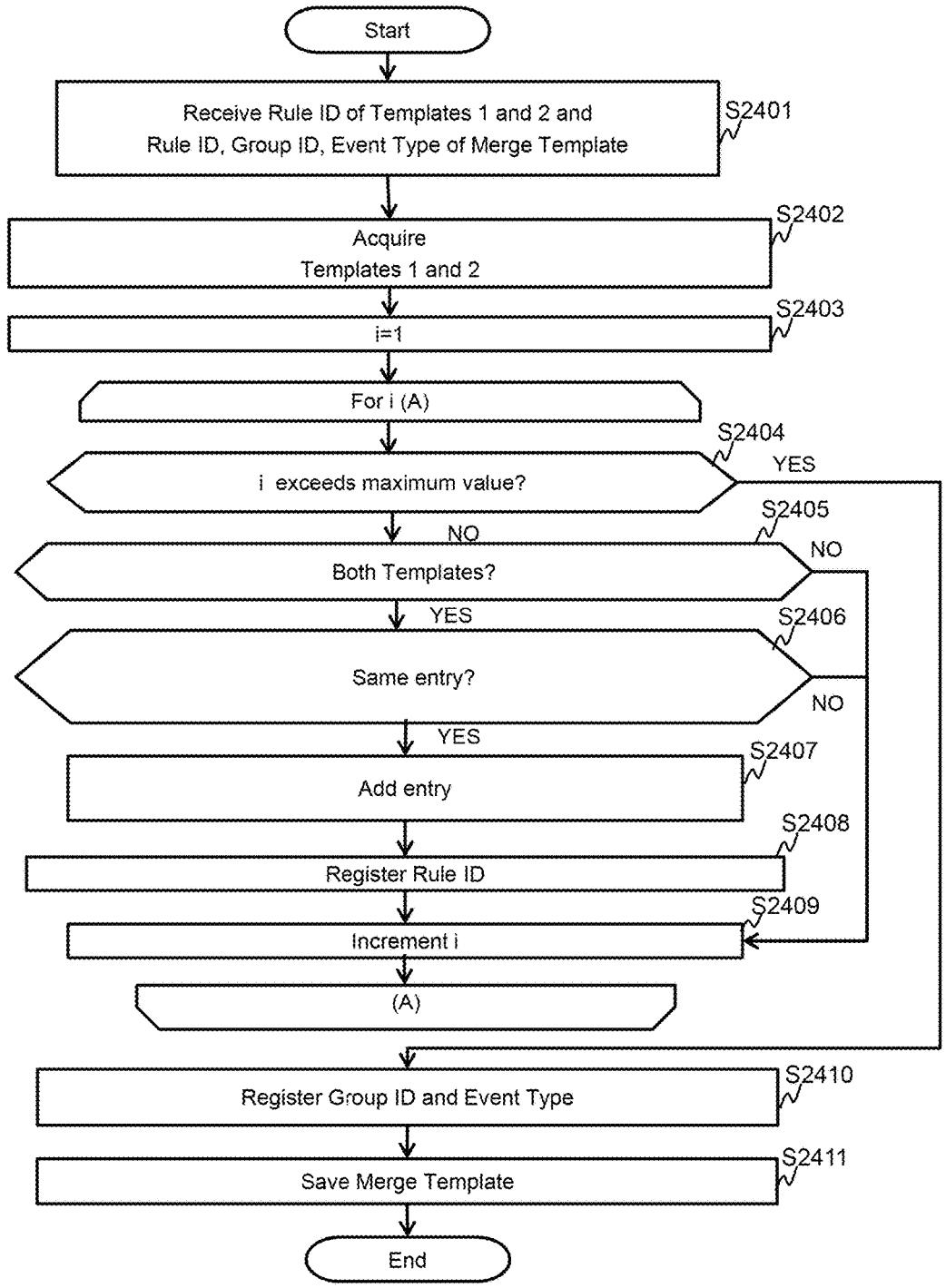
FIG. 24 illustrates an example of AND operation processing.

FIG. 24 illustrates an example of a flow of AND operation processing.

In the AND operation processing, the entries that are the same for the template 1 and the template 2 (the entries, which have the same relative entry order and are the same element type) are added in a new template. The entries that are different between the template 1 and the template 2 (the entries that are different in terms of at least one of the relative entry order and the element type) is not added in the new template.

Specifically, the management server program 541 receives two rule IDs respectively corresponding to the template 1 and the template 2 (hereinafter referred to as "input rule IDs" in the description of FIG. 24), a rule ID associated with a merge destination template (new template table) (hereinafter referred to as an "output rule ID" in the description of FIG. 24), the group ID, and the event type (S2401), for example. The information may be information input by the user, for example.

The management server program 541 acquires the two templates 1 and 2 respectively corresponding to the two input rule IDs (S2402). The management server program 541 configures i=1 (S2403). Here, i is a variable compared with the column number. A loop A (S2404 to S2409) is performed for each value of i. Now, one value for i is described as an example.

The management server program 541 determines whether i exceeds the column number maximum value for both of the template 1 and the template 2 (S2404). When the determination result of S2404 is positive (S2404: YES), the loop A ends.

When the determination result of S2404 is negative (S2404: NO), the management server program 541 determines whether there are column numbers equal to the value of i in the template 1 and the template 2 (S2405).

When the determination result of S2405 is positive (S2405: YES), the management server program 541 determines whether two entries in the template 1 and the template 2 are the same (S2406). "The entries are the same" herein means that at least the relative entry order and the element type are the same, and specifically, contents other than the rule ID, the group ID, and the event type are the same, for example.

When the determination result of S2406 is positive (S2406: YES), the management server program 541 adds the entry of the template 1 out of the same entries in the merge destination template (S2407), to thereby change the rule ID in the added entry to the output rule ID (S2408).

After S2408, or when the determination result of S2405 or S2406 is negative (S2405: NO or S2406: NO), the management server program 541 increments the value of i by 1 (S2409).

When the loop A ends, it means that all the entries that are the same for the template 1 and the template 2 are added in the merge destination template. The management server program 541 registers the group ID and the event type received in S2401 in the first entry of the merge destination template (S2410). Lastly, the management server program 541 saves the merge destination template (S2411). That is, the management server program 541 newly adds the merge destination template on the memory to the template table 1900 as one template table 1900.

Figure 25:
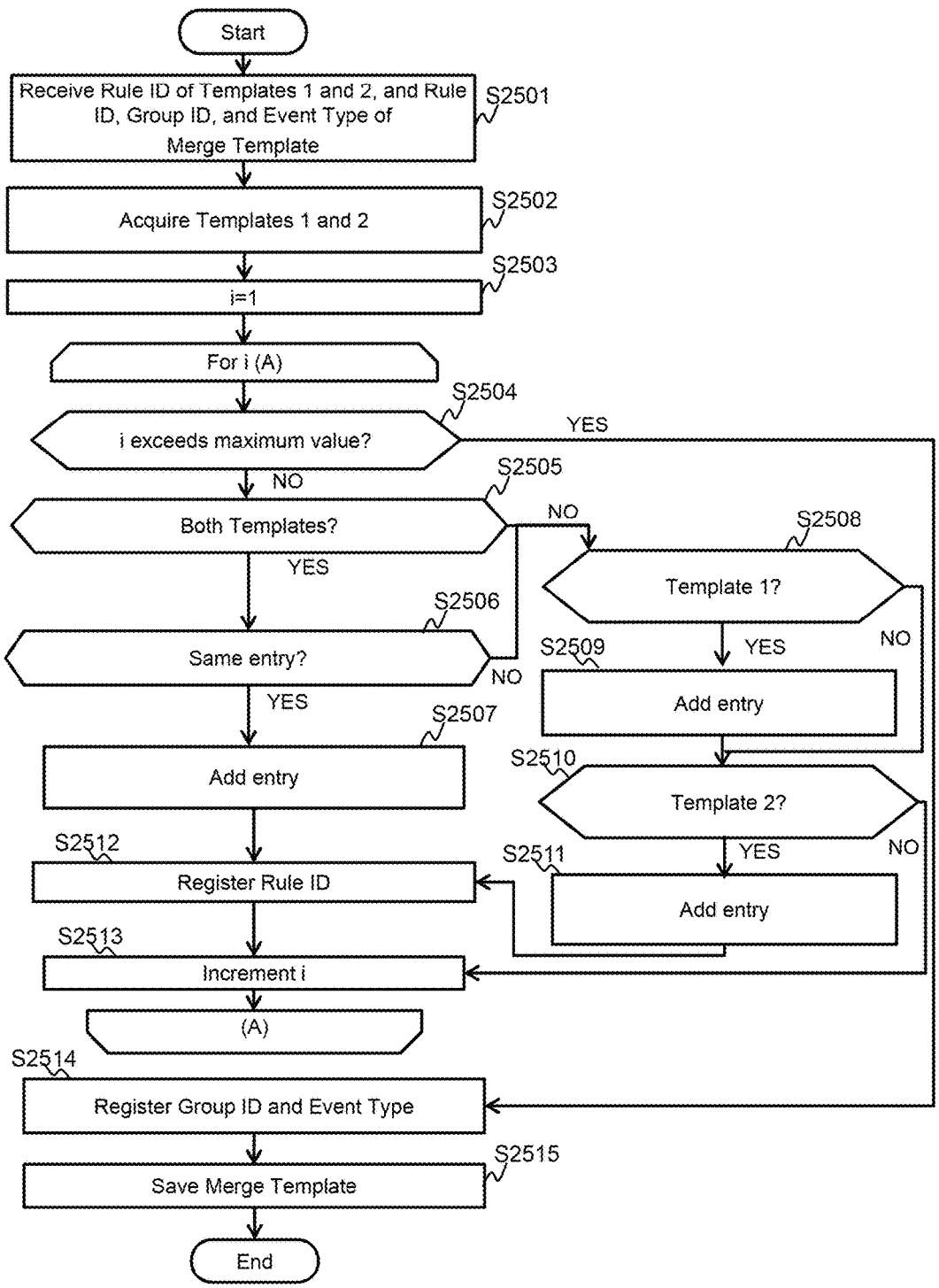
FIG. 25 illustrates an example of OR operation processing.

FIG. 25 illustrates an example of a flow of OR operation processing.

In the OR operation processing, not only the entries that are the same for the template 1 and the template 2, but also the entries that are different between the template 1 and the template 2 are added in the new template.

Specifically, the management server program 541 receives two rule IDs respectively corresponding to the template 1 and the template 2 (hereinafter referred to as "input rule IDs" in the description of FIG. 25), a rule ID associated with the merge destination template (hereinafter referred to as an "output rule ID" in the description of FIG. 25), the group ID, and the event type, for example (S2501).

The management server program 541 acquires the two templates 1 and 2 respectively corresponding to the two input rule IDs (S2502). The management server program 541 configures i=1 (S2503). A loop A (S2504 to S2513) is performed for each value of i. Now, one value for i is described as an example.

The management server program 541 determines whether i exceeds the column number maximum value for both of the template 1 and the template 2 (S2504). When the determination result of S2504 is positive (S2504: YES), the loop A ends.

When the determination result of S2504 is negative (S2504: NO), the management server program 541 determines whether there are column numbers equal to the value of i in the template 1 and the template 2 (S2505).

When the determination result of S2505 is positive (S2505: YES), the management server program 541 determines whether two entries in the template 1 and the template 2 are the same (S2506).

When the determination result of S2506 is positive (S2506: YES), the management server program 541 adds the entry of the template 1 out of the same entries in the merge destination template (S2507).

When the determination result of S2505 or S2506 is negative (S2505: NO or S2506: NO), the management server program 541 determines whether there is an entry having a column number equal to i in the template 1 (S2508). When the determination result of S2508 is positive (S2508: YES), the management server program 541 adds the entry in the merge destination template (S2509). After S2509 (or when the determination result of S2508 is negative (S2508: NO)), the management server program 541 determines whether there is an entry having a column number equal to i in the template 2 (S2510). When the determination result of S2510 is positive (S2510: YES), the management server program 541 adds the entry in the merge destination template (S2511).

The management server program 541 changes the rule ID in the entry (merge destination template) added in S2509, S2511, and S2512 to the output rule ID (S2512). Then, the management server program 541 increment the value of i by 1 (S2513).

When the loop A ends, it means that the entries that are the same for the template 1 and the template 2 and the entries that are different between the template 1 and the template 2 are all added in the merge destination template. The management server program 541 registers the group ID and the event type received in S2501 in the first entry of the merge destination template (S2514). Lastly, the management server program 541 saves the merge destination template (S2515).

Figure 26:
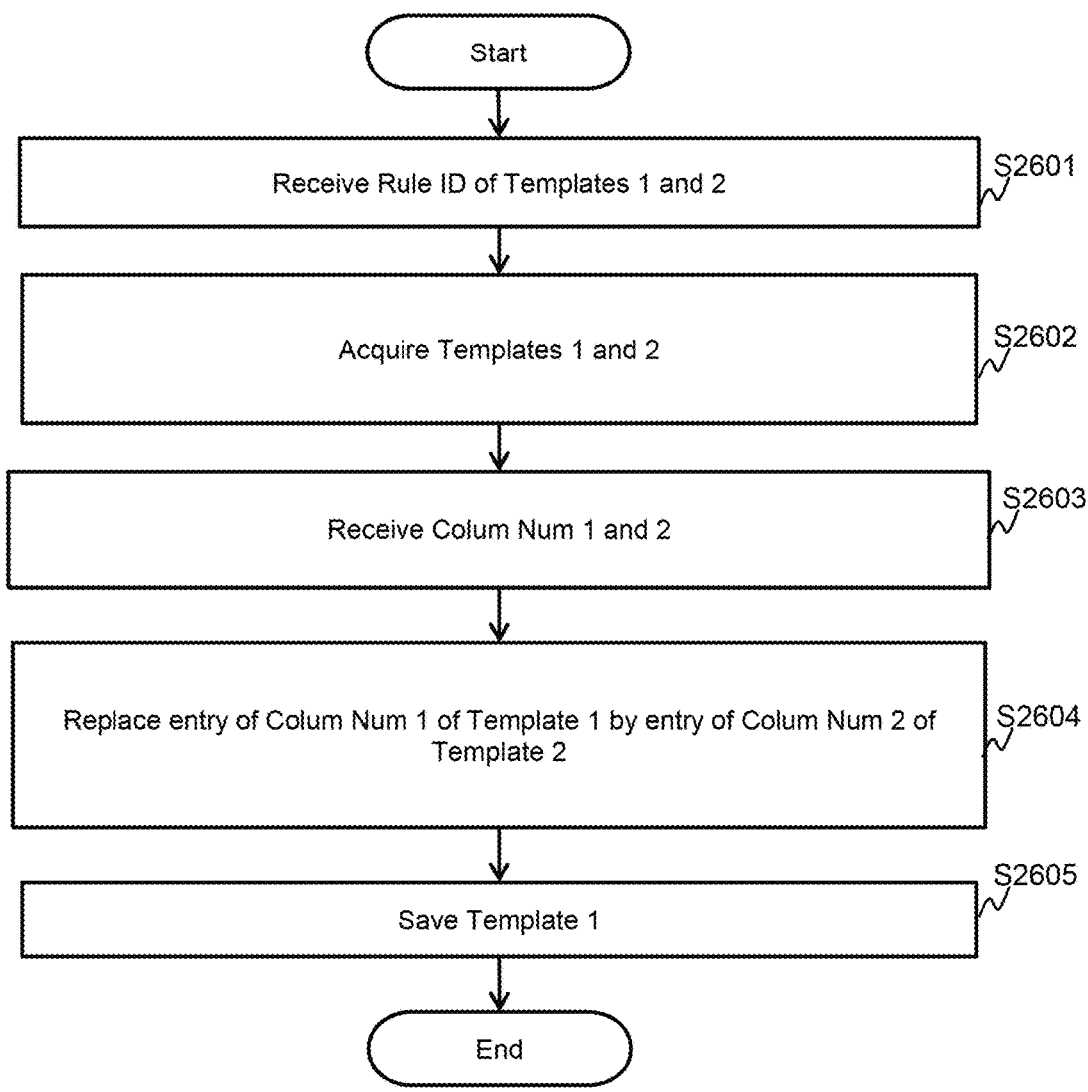
FIG. 26 illustrates an example of a flow of replace operation processing.

FIG. 26 illustrates an example of a flow of replace operation processing.

In the replace operation processing, a part of the entries of the template 1 are replaced by a part of the entries of the template 2.

Specifically, for example, the management server program 541 receives two rule IDs respectively corresponding to the template 1 (to be replaced) and the template 2 (replacing) (S2601).

The management server program 541 acquires the two templates 1 and 2 respectively corresponding to the two input rule IDs (S2602).

The management server program 541 receives the column number (column number 1) to be replaced and the replacing column number (column number 2) (S2603). The column numbers may be numbers input by the user.

The management server program 541 determines an entry 1 that is an entry including the column number 1 from the template 1 and determines an entry 2 that is an entry including the column number 2 from the template 2, to thereby overwrite at least part of the entry 1 (for example, the element type, the metric type, and the threshold value) with at least part of the entry 2 (for example, the element type, the metric type, and the threshold value) (S2604). As a result, the template 1 is updated.

The management server program 541 saves the template 1 after the update (S2605).

Figure 27:
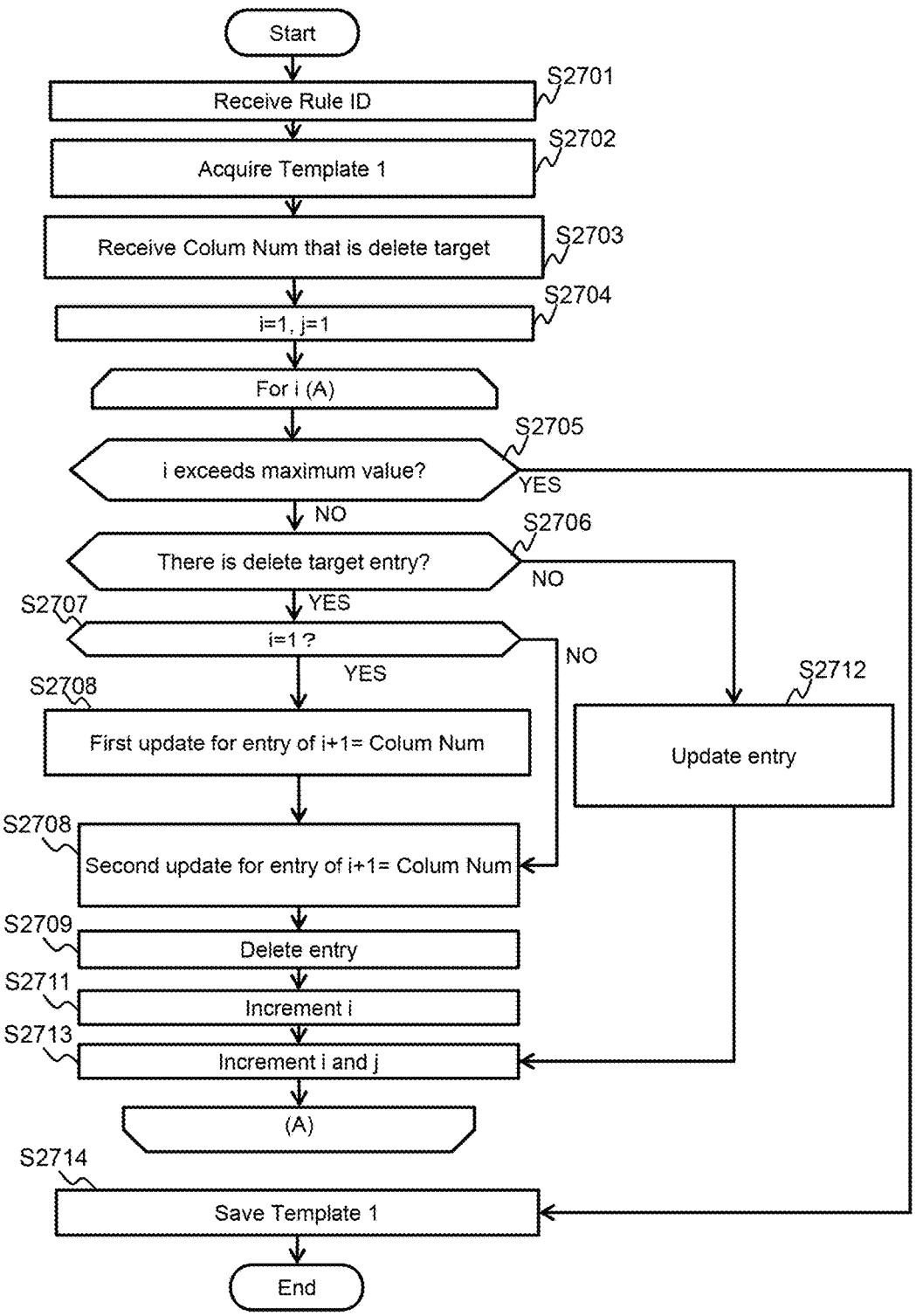
FIG. 27 illustrates an example of a flow of delete operation processing.

FIG. 27 illustrates an example of a flow of delete operation processing.

In the delete operation processing, at least one record of the input template is deleted. That is, when an entry (record) that is the delete target is found from the template, the entry is deleted, and the column numbers and the referred column numbers in the remaining entries are reassigned.

Specifically, the management server program 541 receives the rule ID corresponding to the template to be deleted (template 1), for example (S2701). The management server program 541 acquires the template 1 corresponding to the received input rule ID (S2702). The management server program 541 receives the column number that is the delete target (S2703). The management server program 541 configures i=1 and j=1 (S2704). A loop A (S2705 to S2713) is performed for each value of i. Now, one value for i is described as an example.

The management server program 541 determines whether i exceeds the column number maximum value of the template 1 (S2705). When the determination result of S2705 is positive (S2705: YES), the loop A ends.

When the determination result of S2705 is negative (S2705: NO), the management server program 541 determines whether the delete target column number is equal to the value of i and the column number delete target exists in the template 1 (S2706).

When the determination result of S2706 is negative (S2706: NO), the management server program 541 registers a value of j as the column number and registers a value of (j−1) as the referred column number in the entry of i=column number (S2712). Then, the management server program 541 increments each of i and j by 1 (S2713).

When the determination result of S2706 is positive (S2706: YES), the management server program 541 determines whether i=1 is satisfied (S2707). When the determination result of S2707 is positive (S2707: YES), the management server program 541 overwrites the entry including (i+1)=column number with the rule ID, the group ID, and the event type of the entry including the column number that is the delete target (S2708). After S2708 (or when the determination result of S2707 is negative (S2707: NO)), the management server program 541 registers the value of j as the column number and registers the value of (j−1) as the referred column number in the entry including (i+1)=column number (S2709). Then, the management server program 541 deletes the entry that is the delete target (S2710) and increments i by 1 (S2711), to thereby perform S2713. That is, when the determination result of S2706 is positive, i is incremented by 2 by S2711 and S2713.

Now, the embodiment is recapitulated. In the description of the recapitulation, a new description such as a modified example and the like of the embodiment can be added as appropriate.

The management server 557 is an example of a management system and is configured to manage an information system including a plurality of elements belonging to a plurality of types. The management server 557 includes the I/F 537 coupled to the information system, the storage unit 535, and the processor 533 configured to execute the management server program 541. The processor 533 detects a plurality of elements by collecting the configuration data from the elements (nodes) in the information system, and stores the configuration information including the collected configuration data in the storage unit 535, to thereby monitor the plurality of detected elements. The processor 533 (A) selects a template (the template table 1900) and (B) displays two or more columns lined up in a sequence order in accordance with the template selected in (A).

In (A), the processor 533 selects a template as follows. That is, the template uses the selection element type that is the element type to which one or more elements selected on the basis of the monitoring result (one or more selection elements) belong as the first element type, and is associated with the event type of the event that has occurred in at least one selection element.

Each template includes the first element type, one or more second element types, and the sequence order of display of two or more columns respectively corresponding to the first element type and one or more second element types. In the first column that is the column corresponding to the selection element type among the two or more columns displayed in (B), one or more objects respectively corresponding to one or more selection elements are displayed. In each of one or more second columns that are one or more columns other than the first column among the two or more columns displayed in (B), the object corresponding to the element belonging to the element type corresponding to the second column and topologically related to at least one selection element (related element) is displayed.

Figure 28:
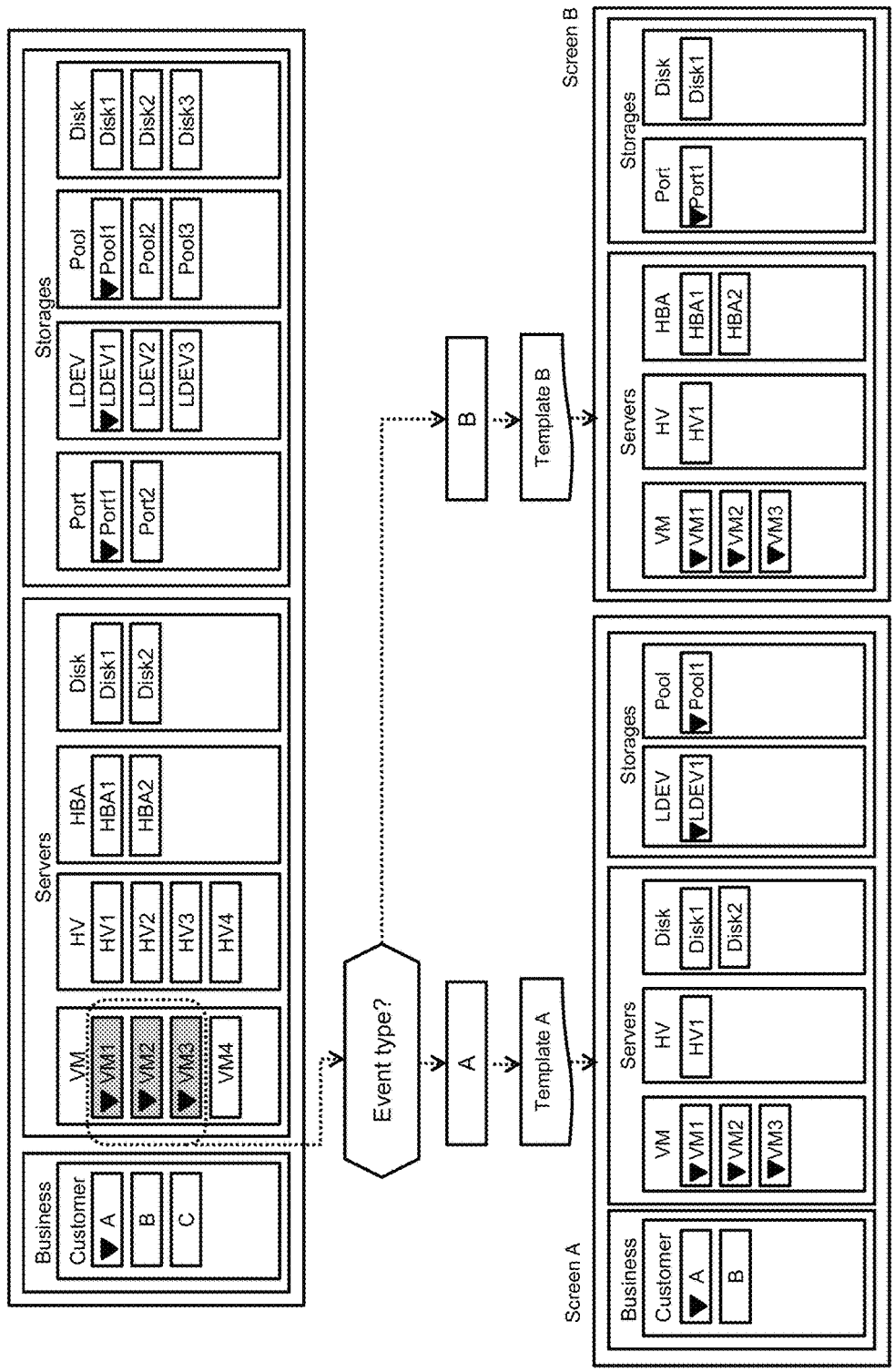
FIG. 28 illustrates an example of an overview of an embodiment.
Figure 29:
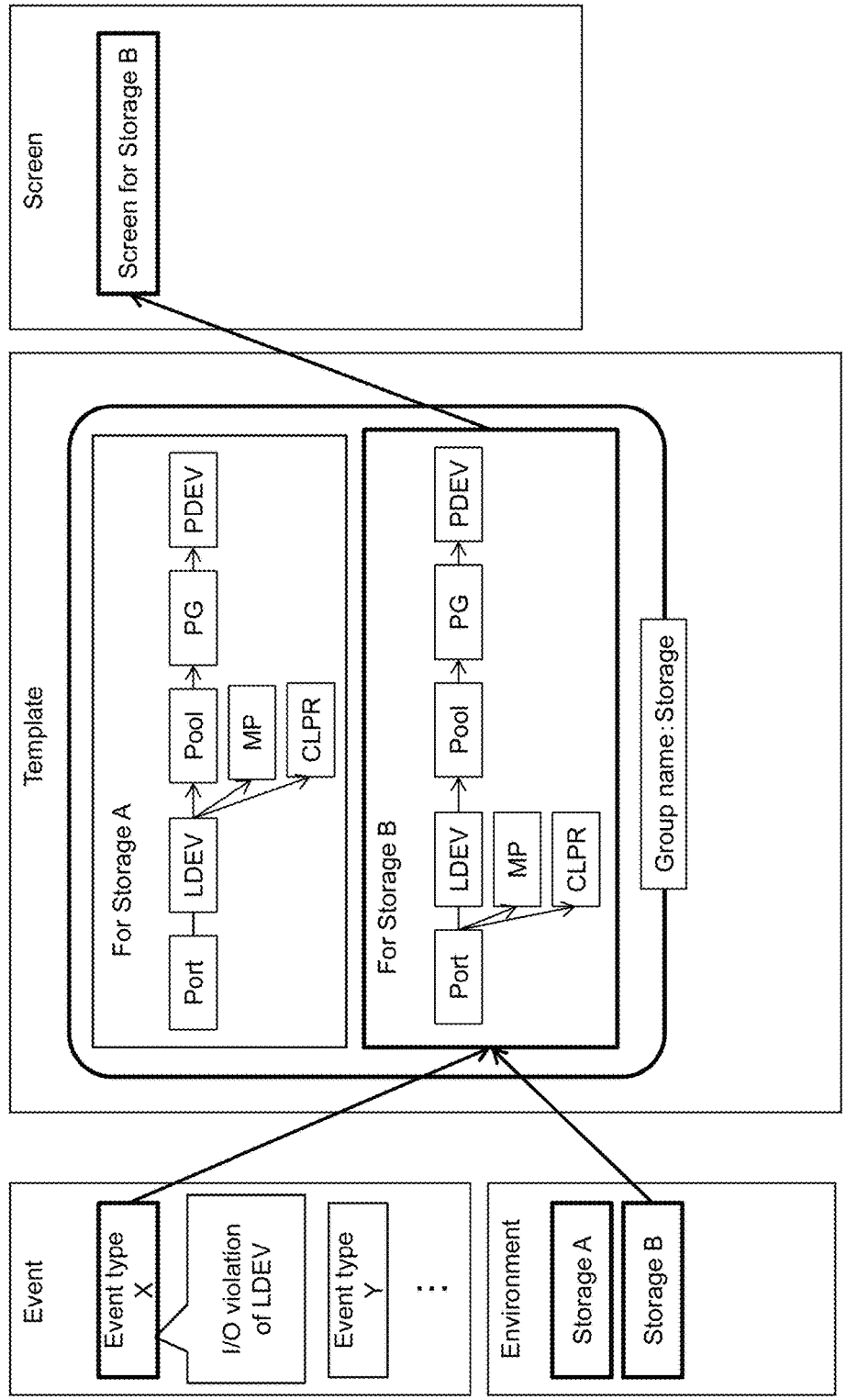
FIG. 29 illustrates an example of an overview of template selection from a template group.

As a result, as exemplified in FIG. 28, when the event type of the event occurring in at least one of the selection elements "VM1" to "VM3" is an event type A, the template A associated with the event type A is selected and a screen A obtained after filtering using the template A is displayed. When the event type of the event occurring in at least one of the selection elements "VM1" to "VM3" is an event type B, the template B associated with the event type B is selected and a screen B obtained after filtering using the template B is displayed. In this way, the multicolumn display using the template suitable for the event type of the event occurring in at least one selection element is performed. The visibility can be expected to be enhanced because filtering using the template is performed. The accuracy of analyzing the event can be expected to be enhanced because the template associated with the type of the event that has occurred is selected and used.

In the embodiment described above, the first column is the head column, but the head column may be an element type "Business" in a level higher than the selection element type "VM" corresponding to the first column as in the screen A (template A) in FIG. 28. The template in not limited to a customized template, and at least one template may be a built-in template.

At least one template is a template, which is output as a result the operation in which one or more templates are input and corresponds to any one of the following (p) to (q).

(p) A template obtained by changing one of the one or more input templates.

(q) A new template different from the one or more input templates.

At least one of the adding and the editing of the template is possible through the operation in which one or more templates are input. As a result, at least one of the adding and the editing of the template is easy. The load of the maintenance of the template can also be expected to be reduced. For example, when there is a configuration change only on the host 553 side, there can be expected a method of only changing the template corresponding to the host side (or the template part (a part of the entries)), and then generating a new template in which the change on the host side is reflected all at once through the OR operation of the host side template after the change and the existing storage side template.

In the operation as described above, the processor 533 does not always need to select the template associated with the event type of the event that has occurred in at least one selection element. That is, the template does not need to be associated with the event type, and the processor 533 may be able to perform at least one of the adding and the editing of the template through the operation in which one or more templates are input also in the environment in which the template as follows is selected. That is, in the template, the selection element type to which one or more selection elements belong is used as the first element type.

The processor 533 generates the template in accordance with the user operation in the past related to the column display, to thereby add the generated template in the storage unit 535.

The number of templates automatically increases in accordance with the user operation such as the operation of the fault investigation (without a corresponding template). As a result, many templates may be generated in the process. In the environment as above, in particular, the template add/edit through the operation in which one or more templates are input is highly convenient.

Each template is a table including one or more entries (records). Each entry includes the information indicating the element type that is the element type corresponding to the column associated with the entry and the information indicating a column next to the column. The processor 533 performs, as operation in which one or more templates are input, any one of the following (x1) to (x4).

(x1) AND operation in which only entries having the same relative entry order and element types for the two or more input templates are added to a new template.

(x2) OR operation in which entries having the same relative entry order and element types for the two or more input templates, and entries in which at least one of a relative entry order and an element type is different between the two or more input templates are added to a new template.

(x3) Replace operation in which at least part of entries in an input template are overwritten with at least part of entries in another input template.

(x4) Delete operation in which at least one entry in an input template is deleted.

The logical operation in which two or more templates are input is not limited to AND/OR, and other types of logical operation may be employed.

As exemplified in FIG. 30, when two or more events corresponding to two or more event element types are occurring in at least one selection element (for example, a certain VM) (reference numeral 3001), in (A), the processor 533 may determine two or more templates in which the selection element type is used as the first element type and which are respectively associated with two or more event element types, execute the OR operation in which the two or more templates are input, and select the new template obtained as the result of the OR operation (reference numeral 3004). In reference numeral 3004, the multicolumn display using the new template as the OR operation result is executed.

In a case such as reference numeral 3001, a screen in which two or more screens respectively corresponding to two or more templates (multicolumn display) can be conceived, but the visibility may decrease. When the template is dynamically generated as the OR operation result of the two or more templates and the template is used, the entire filtering result of the two or more templates corresponding to the two or more event types can be expected to be grasped on one multicolumn display screen (by decreasing the reduction of visibility).

As exemplified in FIG. 30, when two or more events corresponding to two or more event element types are occurring in at least one selection element (for example, a certain VM) (reference numeral 3001), in (A), the processor 533 determines to execute one of the first selection of selecting a part of the templates of two or more templates and the second selection of selecting the new template as the result of the OR operation of the two or more templates (reference numeral 3002). When the second selection is determined to be executed, the OR operation is executed (reference numeral 3004).

As described above, the execution can be carried out selectively using a part of the templates or all of the two or more templates. For example, the first selection may be selected when the number of templates (or the number of display target columns) is smaller than a predetermined number and the second selection may be selected when the number of templates (or the number of display target columns) is equal to or larger than the predetermined number.

As exemplified in FIG. 30, when the first execution is determined, in (A), the processor 533 may line up two or more templates in an order in accordance with the predetermined evaluation axis (for example, the second evaluation axis) (reference numeral 3003). The template is selected from the line up of the two or more templates in accordance with the predetermined evaluation axis. As a result, the template that is preferable in terms of the evaluation axis can be selected. The selection of the template may be manually or automatically performed. In the manual selection, the list in which two or more templates are lined up may be displayed, so that the template desired by the user is manually selected from the list. The list may include the template group. As a result, the size of the list can be reduced, and the visibility of the list can be expected to be enhanced. When the template group is selected, the template may be selected from the template group. In the automatic selection, at least the head template among the two or more templates lined up in accordance with the evaluation axis may be selected. The number of selected templates may be one or two or more.

The processor 533 is configured to generate one template rule group to which predetermined two or more templates belong. In (A), the processor 533 is configured to select a template for an environment related to at least one of the one or more selection elements from at least one predetermined template group. As described above, the "environment" is the node or the client, for example. The environment to which the template belongs may be included in the "Others", for example. There may be a template group for each environment type, for example. Two or more templates can be grouped in terms of the environment type. The "predetermined template group" may be the template group specified by the user or the template group to which the following template belongs. That is, the template is associated with the event element type of the event that has occurred and uses the selection element type as the first element type.

In (A), when there are a plurality of templates, which are associated with the event element type of the event that has occurred in at least one selection elements and in which the selection element type is used as the first element type, the processor 533 is configured to line up the plurality of display rules in an order in accordance with a predetermined evaluation axis. The processor 533 may display the list of the plurality of templates lined up in an order in accordance with the predetermined evaluation axis. As described above, the predetermined evaluation axis may be any one of the following: (R1) an event occurrence time point; (R2) a priority order of an event element type; (R3) an order of generation of a template; (R4) a selection history of a template; (R5) an event element ratio; and (R6) the number of event elements.

In the M-th second column among the two or more columns displayed in (B), the object corresponding to the element in which the event that is the same as the event occurring in occurring in at least one selection element is displayed (M is an integer equal to or larger than 2). In the N-th second column among the two or more columns displayed in (B), the objects respectively corresponding to all the elements topologically related to the element corresponding to the object selected from the objects displayed in the M-th second column is displayed (N>M). The element type corresponding to the M-th second column is an element type that is the same as the element type corresponding to the first column.

In (B), two or more columns are displayed in the column space on the screen including the column space and the work space. The work space is placed above or below the column space on the screen. When the processor 533 receives specification of any one of the objects displayed on the screen and detail display, the processor 533 displays, for the element corresponding to the specified object, the information on the monitoring result or the information on an element corresponding to that element in the work space. The element corresponding to that element belongs to an element type that is different from the element type to which that element belongs.

The processor 533 displays the list of the identification information of the template in which the selection element type is used as the first element type, the template being associated with the event type of the event that has occurred in at least one selection element. In the list, the identification information of the template is displayed in an emphasized manner. When the processor 533 receives the selection of another template in the list, the processor 533 updates the display of the column other than at least the head column in two or more columns in accordance with another selected template.

The template is a rule determined in accordance with the user operation of the past related to the column display. The processor 533 (C) displays the column corresponding to the selection element type as the head column, (D) displays, whenever the element topologically related to at least one of the one or more selected elements is selected in accordance with the user operation, the column including the object corresponding to the selected element or the object corresponding the element topologically related to the selected element, so that the column is lined up with the previous column, and (E) store, when receiving the save instruction for the template, the template in which the sequence order of the displayed column is defined in the storage unit. In the template stored in (E), the first element type is the selection element type corresponding to the head column among the displayed columns, and the second element type is the element type corresponding to the column other than the head column among the displayed columns. In each of (C) and (D), the column is displayed in the column space on the screen including the column space and the work space. The work space is placed above or below the column space on the screen. In each of (C) and (D), when the processor 533 receives specification of any one of the objects displayed on the screen and the detail display, the processor 533 displays, for the element corresponding to the specified object, the information on the monitoring result or the information on an element corresponding to that element and belonging to an element type different from the element type to which that element belongs in the work space. In (C), when there is at least one element, which is topologically related to at least one selection element and in which the event that is the same as the event occurring in at least one of the one or more selected elements is occurring, the processor 533 displays one or more columns respectively corresponding to one or more element types to which the at least one element belongs. The object corresponding to all the elements, which belong to the element type corresponding to the column, topologically relates to at least one selection element, and in which the event that is the same as the event occurring in at least one selection element is occurring, is displayed in each of the displayed one or more columns. In (D), when the selected element is an element in which an event is occurring, the object corresponding to another element, which belongs to the same element type and in which the same event is occurring, is displayed in the same column. When the element selected in (D) is an element in which an event is not occurring, only the selected element is displayed in the column.

The template includes, for the column in which the object corresponding to the element in which the event is occurring is displayed among the two or more columns, the conditions for the element to become the display target. The event is a fault. The conditions are the metric element type used for determining that the fault is occurring in the selected event and the threshold value of the metric value belonging to the metric element type.

The two or more columns displayed in (B) are lined up in accordance with the sequence order from left to right or from right to left.

While one embodiment has been described, the embodiment is only an example for describing this invention, and the scope of this invention is not intended to be limited to this embodiment. This invention can be embodied in other various forms.

For example, the overall configuration screen may be a general topology view screen in which the relationship between the elements is expressed by connection lines instead of the multicolumn type screen.

For example, the conditions for an element (object) to be displayed in the second element type column and subsequent element type columns on the failure investigation screen may include a condition that the element is an element relating to a number of L elements (objects) among a number of K elements in the first element type column. Here, K is an integer equal to or larger than 1. L is equal to or smaller than K, and may be a value determined on the basis of a predetermined ratio of h (0<h≤1) to K.

For example, the tables do not need to be separated as for the temporary template table 1950 and the template table 1900, and the temporary template table 1950 is not necessary. In that case, in the template table 1900, the rule ID of the entry corresponding to the temporary template may be a value indicating a correspondence to the temporary template such as "−1".

The name of the user operation causing the column display (for example, the column development operation, the column adding operation, or the influence range display operation) may be associated and displayed in each second element type column on the failure investigation screen.

REFERENCE SIGNS LIST 100 information system
555 Management client
557 Management server

The invention claimed is:

1. A management system managing an information system comprising a plurality of elements belonging to a plurality of types, the management system comprising:
an interface device coupled to the information system;
a storage unit; and
a processor configured to collect configuration information from the information system, to thereby detect the plurality of elements, store the configuration information in the storage unit, and monitor the plurality of detected elements,
wherein the processor is configured to:
(A) select a display rule in which a selection type that is a type to which one or more elements selected on the basis of a monitoring result belong is used as a first type, wherein the element selected is an element with a predefined metric value exceeding a threshold value, the display rule being associated with an event type of an event that has occurred in at least one of the one or more selected elements; and
(B) display two or more columns lined up in a sequence order in accordance with the display rule selected in (A),
wherein each display rule comprises a first type, one or more second types, and a sequence order of display for two or more columns respectively corresponding to the first type and one or more second types,
wherein one or more objects respectively corresponding to the one or more selected elements are displayed in a first column that is a column corresponding to the selection type among the two or more columns displayed in (B), and
wherein, in each of one or more second columns that are one or more columns other than the first column among the two or more columns displayed in (B), an object corresponding to an element belonging to a type corresponding to the second column and topologically related to at least one of the one or more selected elements is displayed.

2. The management system according to claim 1, wherein at least one display rule is a display rule that is output as a result of operation in which one or more display rules are input, the display rule corresponding to any one of the following (p) and (q):
(p) a display rule in which one among the input one or more display rules is changed; and
(q) a new display rule different from the input one or more display rules.

3. The management system according to claim 2, wherein the processor is configured to:
generate a display rule in accordance with user operation in the past related to column display; and
add the generated display rule in the storage unit.

4. The management system according to claim 2, wherein each display rule comprises a table comprising one or more records,
wherein each of the records comprises information indicating on an element type that is a type corresponding to a column associated with the record, and information indicating a column next to the column, and
wherein the processor is configured to perform, as operation in which one or more display rules are input, any one of the following (x1) to (x4):
(x1) AND operation in which only records having the same relative record order and element types for the two or more input display rules are added to a new display rule;
(x2) OR operation in which records having the same relative record order and element types for the two or more input display rules, and records in which at least one of a relative record order and an element type is different between the two or more input display rules are added to a new display rule;
(x3) replace operation in which at least part of records in an input display rule are overwritten with at least part of records in another input display rule; and
(x4) delete operation in which at least one record in an input display rule is deleted.

5. The management system according to claim 2, wherein each display rule is a table comprising one or more records,
wherein each of the records comprises information indicating an element type that is a type corresponding to a column associated with the record and information indicating a column next to the column, and
wherein, when two or more events corresponding to two or more event types have occurred in at least one of the one or more selected elements, in (A) the processor is configured to:
(a1) determine two or more display rules in which a selection type that is a type to which the one or more selected elements belong is used as a first type, and the two or more display rules respectively are associated with two or more event types of two or more events that have occurred in at least one of the one or more selected elements;
(a2) execute OR operation in which records of which relative record order and element types are the same for the two or more determined display rules, and records of which relative record order and element types are different between the two or more determined display rules are added to a new display rule; and
(a3) select a new display rule as a result of the OR operation.

6. The management system according to claim 5, wherein, when two or more events corresponding to two or more event types have occurred in at least one of the one or more selected elements, in (A) the processor is configured to determine which selection to be executed out of first selection of selecting a part of display rules of two or more display rules, and second selection of selecting a new display rule as a result of OR operation of two or more display rules, and
wherein, when determination is made that the second selection is to be executed, (a1) to (a3) are executed.

7. The management system according to claim 6, wherein, when it is determined that the first selection is to be executed, in (A) the processor is configured to line up the two or more display rules in an order in accordance with a predetermined evaluation axis, and wherein a display rule is selected from the line up of two or more display rules in accordance with the predetermined evaluation axis.

8. The management system according to claim 2, wherein the processor is configured to generate one display rule group to which predetermined two or more display rules belong, wherein, in (A) the processor is configured to display a rule list, and wherein, when there is a display rule group to which the display rule, which is associated with the event type of the event that has occurred and in which the selection type is used as the first type, belongs, the rule list comprises the display rule group in place of the display rule belonging to the display rule group.

9. The management system according to claim 1, wherein the processor is configured to generate one display rule group to which predetermined two or more display rules belong, and wherein, in (A), the processor is configured to select a display rule for an environment related to at least one of the one or more selected elements from at least one predetermined display rule group.

10. The management system according to claim 9, wherein the predetermined display rule group comprises a display rule group specified by a user or a display rule group to which the display rule, which is associated with the event type of the event that has occurred and in which the selection type is used as the first type, belongs.

11. The management system according to claim 1, wherein, in (A) when there are a plurality of display rules, which are associated with the event type of the event that has occurred in at least one of the one or more selected elements and in which the selection type is used as the first type, the processor is configured to line up the plurality of display rules in an order in accordance with a predetermined evaluation axis.

12. The management system according to claim 11, wherein, in (A) the processor is configured to display a list of the plurality of display rules lined up in an order in accordance with the predetermined evaluation axis.

13. The management system according to claim 12, wherein the predetermined evaluation axis is any one of the following:

(R1) an event occurrence time point;
(R2) a priority order of an event type;
(R3) an order of generation of a display rule;
(R4) a selection history of a display rule;
(R5) an event element ratio; and
(R6) the number of event elements, wherein an event element comprises an element in which an event has occurred among the one or more selected elements, wherein the event element ratio is a ratio of the number of event elements to the number of the selected one or more elements, and wherein the number of event elements is the number of event elements among event elements in one or more selected elements.

14. The management system according to claim 1, wherein the first column is a head column.

15. A management method executed by at least one computer, executing a management program, coupled to an information system including a plurality of elements of a plurality of types, the method comprising:

collecting configuration information from the information system, to thereby detect the plurality of elements;

monitoring the plurality of detected elements;

selecting a display rule in which a selection type that is a type to which one or more elements selected on the basis of a monitoring result belong is used as a first type, wherein the element selected is an element with a predefined metric value exceeding a threshold value, the display rule being associated with an event type of an event that has occurred in at least one of the one or more selected elements; and displaying two or more columns lined up in a sequence order in accordance with the selected display rule, wherein each display rule is a customized rule and comprises a first type, one or more second types, and a sequence order of display for two or more columns respectively corresponding to the first type and one or more second types, wherein one or more objects respectively corresponding to the one or more selected elements are displayed in a first column that is a column corresponding to the selection type among the two or more displayed columns, and wherein, in each of one or more second columns that are one or more columns other than the first column among the two or more displayed columns, an object corresponding to an element belonging to a type corresponding to the second column and topologically related to at least one of the one or more selected elements is displayed.

* * * * *